United States Patent
Andersson et al.

(10) Patent No.: US 12,003,716 B2
(45) Date of Patent: *Jun. 4, 2024

(54) DEBLOCKING FILTER SELECTION IN VIDEO OR IMAGE CODING

(71) Applicant: Telefonaktiebolaget LM Ericsson (publ), Stockholm (SE)

(72) Inventors: Kenneth Andersson, Gävle (SE); Jack Enhorn, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,100

(22) Filed: Dec. 15, 2022

(65) Prior Publication Data

US 2023/0199180 A1    Jun. 22, 2023

Related U.S. Application Data

(63) Continuation of application No. 17/685,890, filed on Mar. 3, 2022, now Pat. No. 11,533,481, which is a
(Continued)

(51) Int. Cl.
*H04N 11/02* (2006.01)
*H04N 19/117* (2014.01)
(Continued)

(52) U.S. Cl.
CPC ......... *H04N 19/117* (2014.11); *H04N 19/132* (2014.11); *H04N 19/176* (2014.11); *H04N 19/82* (2014.11)

(58) Field of Classification Search
CPC ................................................... H04N 19/117
(Continued)

(56) References Cited

U.S. PATENT DOCUMENTS 10,972,729 B2    4/2021    Gadde et al.
2005/0013363 A1  1/2005    Cho et al.
(Continued)

FOREIGN PATENT DOCUMENTS

CN    103299632 A      9/2013
WO    2015/138714 A1   9/2015
(Continued)

OTHER PUBLICATIONS

Mathias Wien et al., "Versatile Video Coding—Algorithms and Specification", IEEE ICME, Jul. 10, 2020 (167 pages).
(Continued)

*Primary Examiner* — Leron Beck

(74) *Attorney, Agent, or Firm* — Rothwell, Figg, Ernst & Manbeck, P.C.

(57) ABSTRACT

The long filter decision in VVC is modified by adding at least one gradient check that at least includes sample p6 or q6. This makes it possible to avoid using the long filters when there is some natural structure at sample p6 or q6. In one specific embodiment at least two gradient checks including both q6 and p6 are added. In another embodiment, the dpq threshold is modified from beta>>2 to beta>>4. This
(Continued)

threshold change embodiment may be used in conjunction with or instead of the embodiment in which a gradient check that includes p6 and/or q6 is added to the long filter decision.

19 Claims, 7 Drawing Sheets

Related U.S. Application Data continuation of application No. PCT/SE2020/050835, filed on Sep. 4, 2020.

(60) Provisional application No. 62/897,004, filed on Sep. 6, 2019.

(51) Int. Cl.
  *H04N 19/132* (2014.01)
  *H04N 19/176* (2014.01)
  *H04N 19/82* (2014.01)
(58) Field of Classification Search
  USPC .................................. 375/240.01–240.29
  See application file for complete search history.

(56) References Cited

U.S. PATENT DOCUMENTS

| | | |
|---|---|---|
| 2007/0223591 A1 | 9/2007 | Doshi |
| 2008/0013855 A1 | 1/2008 | Kikuchi |
| 2015/0154740 A1 | 6/2015 | Jang |
| 2015/0264406 A1 | 9/2015 | Kim et al. |
| 2019/0089969 A1 | 3/2019 | Han et al. |
| 2019/0238890 A1 | 8/2019 | Tsai et al. |
| 2021/0321096 A1 | 10/2021 | Ahn |

FOREIGN PATENT DOCUMENTS

| | | |
|---|---|---|
| WO | 2019/072582 A1 | 4/2019 |
| WO | 2019/129509 A1 | 7/2019 |
| WO | 2019/137750 A1 | 7/2019 |
| WO | 2019/144732 A1 | 8/2019 |
| WO | 2019/185131 A1 | 10/2019 |
| WO | 2019/188944 A1 | 10/2019 |
| WO | 2020/096510 A1 | 5/2020 |
| WO | 2020/100764 A1 | 5/2020 |
| WO | 2020/171760 A1 | 8/2020 |
| WO | 2020/180166 A1 | 9/2020 |

OTHER PUBLICATIONS

International Search Report and Written Opinion issued in International Application No. PCT/SE2020/050835 dated Nov. 13, 2020 (15 pages).
IPRP issued in International Application No. PCT/SE2020/050835 dated Nov. 15, 2021 (20 pages).
Kiran Misra et al., "Tools for Video Coding Beyond HEVC: Flexible Partitioning, Motion Vector Coding, Luma Adaptive Quantization, and Improved Deblocking", IEEE Transactions on Circuits and Systems for Video Technology, vol. 30, No. 5, May 2020 (pp. 1361-1373).
K. Andersson et al., "Non-CE5: Fixes for long luma deblocking filter decision", Document: JVET-P0411, Joint Video Experts Team (JVET) of ITU-T SG 16 WP 3 and ISO/IEC JTC 1/SC 29/WG 11, 16th Meeting: Geneva, CH, Oct. 2019 (pp. 1-7).
K. Andersson et al., "CE1-1.1 to CE1-1.3: Fixes for long luma deblocking filter decision", Document: JVET-Q0054, Joint Video Experts Team (JVET) of ITU-T SG 16 WP 3 and ISO/IEC JTC 1/SC 29/WG 11, 17th Meeting: Brussels, BE, Jan. 2020, (pp. 1-11).
Han Boon Teo et al., "CE1-related: Long luma deblocking filter decision modification", Document: JVET-Q0322-v1, Joint Video Experts Team (JVET) of ITU-T SG 16 WP 3 and ISO/IEC JTC 1/SC 29/WG 11, 17th Meeting: Brussels, BE, Jan. 2020 (pp. 1-5).
M. Ikeda et al., "CE11.1.6, CE11.1.7 and CE11.1.8: Joint proposals for long deblocking from Sony, Qualcomm, Sharp, Ericsson", Document: JVET-M0471, Joint Video Experts Team (JVET) of ITU-T SG 16 WP 3 and ISO/IEC JTC 1/SC 29/WG 11, 13th Meeting: Marrakesh, MA, Jan. 2019 (pp. 1-11).
Andrey Norkin et al., "CE11: Summary Report on Deblocking", Document: JVET-M0031-v4, Joint Video Experts Team (JVET) of ITU-T SG 16 WP 3 and ISO/IEC JTC 1/SC 29/WG 11, 13th Meeting: Marrakech, MA, Jan. 2019 (pp. 1-21).
Benjamin Bross et al., "Versatile Video Coding (Draft 6)", Document JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019 (455 pages).
Weijia Zhu, "CE11: Deblocking modifications for Large CUs both luma and chroma" (Test 11.1.7a and CE11.1.7b), Joint Video Experts Team (JVET) of ITU-T SG 16 WP 3 and ISO/IEC JTC 1/SC 29/WG 11, Document: JVET-L0405rl, 12th Meeting: Macaco, CN, Oct. 3-12, 2018 (11 pages).

DEBLOCKING FILTER SELECTION IN VIDEO OR IMAGE CODING

CROSS-REFERENCE TO RELATED APPLICATIONS

This application is a continuation of U.S. patent application Ser. No. 17/685,890, filed on Mar. 3, 2022 (status pending), which is a by-pass continuation of International Patent Application No. PCT/SE2020/050835, filed on Sep. 4, 2020, which claims priority to U.S. Provisional Patent Application No. 62/897,004, filed on Sep. 6, 2019. The above identified applications are incorporated by this reference.

TECHNICAL FIELD

This disclosure relates to video and/or image coding and decoding.

BACKGROUND

A video sequence consists of a series of images where each image consists of one or more components. Each component can be described as a two-dimensional rectangular array of sample values. It is common that an image in a video sequence consists of three components; one luma component Y where the sample values are luma values and two chroma components Cb and Cr, where the sample values are chroma values. Other examples include Y' Cb Cr, Yuv and ICTCP. In ICTCP, I is the "intensity luma" component. For the remainder of this document we will refer to any luma component Y', Y or I as Y or simply luma. It is common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components.

A "block" is a two-dimensional array of samples. In video coding, each component is split into one or more blocks and the coded video bitstream is a series of blocks. It is common in video coding that an image is split into units that cover a specific area of the image. Each unit consist of all blocks from all components that make up that specific area and each block belongs fully to one unit. The macroblock in H.264 and the Coding unit (CU) in HEVC are examples of units.

In HEVC, each image is partitioned into coding tree units (CTU). A CTU consist of an N×N block of luma samples and two M×M corresponding chroma blocks. A CTU in HEVC is like macroblocks in H.264 and earlier standards but in contrast to macroblocks the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is further the root node of two other trees, the prediction tree that has prediction units (PUs) as nodes and the transform tree that has transform units (TUs) as nodes. Some decoding processes in HEVC are done on the CU level, some are done on the PU level and some on TU level. Boundaries between PUs and boundaries between TUs are filtered by a deblocking filter to reduce discontinuities between TUs and PUs. In HEVC there exist two kinds of prediction types for a PU, intra prediction which only uses prediction from previously decoded samples of the current image for prediction, and inter prediction which uses prediction form at least one previously decoded image.

In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (bs) is set for each boundary. If the value of bs is larger than 0, then deblocking may be applied. The larger the boundary strength is, the stronger filtering is applied. First it is checked if any of the blocks at a PU boundary between the blocks is an intra predicted block then (bs is set to=2), or if both blocks use inter prediction but and they use different reference frames or have significantly different motion vectors then (bs is set to =1). It is also checked if a TU boundary between the blocks has non-zero transform coefficients in at least one of the blocks (code block flag CBF equal to 1), then (bs is set to =1). This first check sets a boundary strength (bs) which is larger than 0 to indicate that deblocking should be applied. The larger the boundary strength is the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0−2*p1+p2)+abs(q0-2*q1+q2)<beta, where beta (also denoted "β") is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that 4 sample part of the boundary. Chroma boundaries may always be filtered if one any of the neighbouring blocks are intra coded.

In the current draft of the specification for VVC (VVC draft 6 JVET-O2001-v14) a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree or transform tree as in HEVC. However, a CU in VVC can be divided into a multiple of TUs or into a multiple of prediction subblocks.

In the current draft of the specification for VVC (VVC draft 6 JVET-O2001-v14), the deblocking is applied on an 4×4 grid for CUs first on vertical boundaries (CU/implicit TU/prediction sub-block boundaries) and then on horizontal boundaries (CU/implicit TU/prediction sub-blocks). Prediction sub-block boundaries inside a CU is filtered on an 8×8 grid. The deblocking is based on HEVC deblocking but also have longer deblocking filters if the size orthogonal to the block boundary is equal to or larger than 32 on at least one side for luma and the other side is larger than 4, modifying at most 7 samples (reading at most 8 samples), if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples otherwise it modifies at most one sample and reading at most two samples on respective side of the boundary.

The VVC specification (JVET-O2001-v14) has long filters and decisions specified in section 8.8.3 Deblocking filter process.

The deblocking decisions are computed for line 0 and line 4 for segments of for lines.

FIG. 3 show a boundary between first block 302 (denoted the "P block") and a second block 304 (denoted the "Q block") for 4 lines, line 0 to line 3, and for eight sample, samples 0 to 7, for each line and block.

The following is an excerpt from The VVC specification (JVET-O2001-v14). This excerpt is directed to the long filter decision.

——Begin Excerpt——

8.8.3.6.1 Decision Process for Luma Block Edges
. . .

The following ordered steps apply:

1. The variables dp0, dp3, dq0 and dq3 are derived as follows:

$$dp0 = \text{Abs}(p_{2,0} - 2*p_{1,0} + p_{0,0}) \tag{8-1077}$$

$$dp3 = \text{Abs}(p_{2,3} - 2*p_{1,3} + p_{0,3}) \tag{8-1078}$$

$$dq0 = \text{Abs}(q_{2,0} - 2*q_{1,0} + q_{0,0}) \tag{8-1079}$$

$$dq3 = \text{Abs}(q_{2,3} - 2*q_{1,3} + q_{0,3}) \tag{8-1080}$$

2. When maxFilterLengthP and maxFilterLengthQ both are equal to or greater than 3 the variables sp0, sq0, spq0, sp3, sq3 and spq3 are derived as follows:

$$sp0 = \text{Abs}(p_{3,0} - p_{0,0}) \tag{8-1081}$$

$$sq0 = \text{Abs}(q_{0,0} - q_{3,0}) \tag{8-1082}$$

$$spq0 = \text{Abs}(p_{0,0} - q_{0,0}) \tag{8-1083}$$

$$sp3 = \text{Abs}(p_{3,3} - p_{0,3}) \tag{8-1084}$$

$$sq3 = \text{Abs}(q_{0,3} - q_{3,3}) \tag{8-1085}$$

$$spq3 = \text{Abs}(p_{0,3} - q_{0,3}) \tag{8-1086}$$

3. The variables sidePisLargeBlk and sideQisLargeBlk are set equal to 0.
4. When maxFilterLengthP is greater than 3, sidePisLargeBlk is set equal to 1:
5. When maxFilterLengthQ is greater than 3, sideQisLargeBlk is set equal to 1:
6. When edgeType is equal to EDGE_HOR and (yCb+yB1) % CtbSizeY is equal to 0, sidePisLargeBlk is set equal to 0.
7. The variables dSam0 and dSam3 are initialized to 0.
8. When sidePisLargeBlk or sideQisLargeBlk is greater than 0, the following applies:
   a. The variables dp0L, dp3L are derived and maxFilterLengthP is modified as follows:
      If sidePisLargeBlk is equal to 1, the following applies:

$$dp0L = (dp0 + \text{Abs}(p_{5,0} - 2*p_{4,0} + p_{3,0}) + 1) >> 1 \tag{8-1087}$$

$$dp3L = (dp3 + \text{Abs}(p_{5,3} - 2*p_{4,3} + p_{3,3}) + 1) >> 1 \tag{8-1088}$$

Otherwise, the following applies:

$$dp0L = dp0 \tag{8-1089}$$

$$dp3L = dp3 \tag{8-1090}$$

$$\text{maxFilterLength}P = 3 \tag{8-1091}$$

b. The variables dq0L and dq3L are derived as follows:
   If sideQisLargeBlk is equal to 1, the following applies:

$$dq0L = (dq0 + \text{Abs}(q_{5,0} - 2*q_{4,0} + q_{3,0}) + 1) >> 1 \tag{8-1092}$$

$$dq3L = (dq3 + \text{Abs}(q_{5,3} - 2*q_{4,3} + q_{3,3}) + 1) >> 1 \tag{8-1093}$$

Otherwise, the following applies:

$$dq0L = dq0 \tag{8-1094}$$

$$dq3L = dq3 \tag{8-1095}$$

c. The variables dpq0L, dpq3L, and dL are derived as follows:

$$dpq0L = dp0L + dq0L \tag{8-1096}$$

$$dpq3L = dp3L + dq3L \tag{8-1097}$$

$$dL = dpq0L + dpq3L \tag{8-1098}$$

d. When dL is less than β, the following ordered steps apply:
   i. The variable dpq is set equal to 2*dpq0L.
   ii. The variable sp is set equal to sp0, the variable sq is set equal to sq0 and the variable spq is set equal to spq0.
   iii. The variables $p_0$ p3 $q_o$ and q3 are first initialized to 0 and then modified according to sidePisLargeBlk and sideQisLargeBlk as follows:
      When sidePisLargeBlk is equal to 1, the following applies:

$$p_3 = p_{3,0} \tag{8-1099}$$

$$p_0 = p_{maxfilterLengthP,0} \tag{8-1100}$$

When sideQisLargeBlk is equal to 1, the following applies:

$$q_3 = q_{3,0} \tag{8-1101}$$

$$q_0 = q_{maxFilterLengthQ,0} \tag{8-1102}$$

iv. For the sample location (xCb+xB1, yCb+yB1), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam0.
   v. The variable dpq is set equal to 2*dpq3L.
   vi. The variable sp is set equal to sp3, the variable sq is set equal to sq3 and the variable spq is set equal to spq3.
   vii. The variables $p_0$ $p_3$ $q_0$ and $q_3$ are first initialized to 0 and are then modified according to sidePisLargeBlk and sideQisLargeBlk as follows:
      When sidePisLargeBlk is equal to 1, the following applies:

$$p_3 = p_{3,3} \tag{8-1103}$$

$$p_0 = p_{maxfilterLengthP,3} \tag{8-1104}$$

When sideQisLargeBlk is equal to 1, the following applies:

$$q_3 = q_{3,3} \tag{8-1105}$$

$$q_0 = q_{maxFilterLengthQ,3} \tag{8-1106}$$

viii. When edgeType is equal to EDGE_VER for the sample location (xCb+xB1, yCb+yB1+3) or when edgeType is equal to EDGE_HOR for the sample location (xCb+xB1+3, yCb+yB1), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, $\beta$ and $t_C$ as inputs, and the output is assigned to the decision dSam3.

9. The variables dE, dEp and dEq are derived as follows:
   If dSam0 and dSam3 are both equal to 1, the variable dE is set equal to 3, dEp is set equal to 1, and dEq is set equal to 1.
   Otherwise, the following ordered steps apply:
   a. The variables dpq0, dpq3, dp, dq and d are derived as follows:

$$dpq0 = dp0 + dq0 \quad (8\text{-}1107)$$

$$dpq3 = dp3 + dq3 \quad (8\text{-}1108)$$

$$dp = dp0 + dp3 \quad (8\text{-}1109)$$

$$dq = dq0 + dq3 \quad (8\text{-}1110)$$

$$d = dpq0 + dpq3 \quad (8\text{-}1111)$$

b. The variables dE, dEp, dEq, sidePisLargeBlk and sideQisLargeBlk are set equal to 0.
   c. When d is less than $\beta$ and both maxFilterLengthP and maxFilterLengthQ are greater than 2, the following ordered steps apply:
      i. The variable dpq is set equal to 2*dpq0.
      ii. The variable sp is set equal to sp0, the variable sq is set equal to sq0 and the variable spq is set equal to spq0.
      iii. For the sample location (xCb+xB1, yCb+yB1), the decision process for a luma sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, $\beta$ and $t_C$ as inputs, and the output is assigned to the decision dSam0.
      iv. The variable dpq is set equal to 2*dpq3.
      v. The variable sp is set equal to sp3, the variable sq is set equal to sq3 and the variable spq is set equal to spq3.
      vi. When edgeType is equal to EDGE_VER for the sample location (xCb+xB1, yCb+yB1+3) or when edgeType is equal to EDGE_HOR for the sample location (xCb+xB1+3, yCb+yB1), the decision process for a sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, $\beta$ and $t_C$ as inputs, and the output is assigned to the decision dSam3.
   d. When d is less than $\beta$, the following ordered steps apply:
      i. The variable dE is set equal to 1.
      ii. When dSam0 is equal to 1 and dSam3 is equal to 1, the variable dE is set equal to 2.
      iii. When maxFilterLengthP is greater than 1, and maxFilterLengthQ is greater than 1, and dp is less than $(\beta+(\beta>>1))>>3$, the variable dEp is set equal to 1.
      iv. When maxFilterLengthP is greater than 1, and maxFilterLengthQ is greater than 1, and dq is less than $(\beta+(\beta>>1))>>3$, the variable dEq is set equal to 1.

TABLE 8-18

Derivation of threshold variables $\beta'$ and $t_C'$ from input Q v.

| | Q | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| $\beta'$ | 0 | 0 | 0 | 0 | 0 | 0 | 0 | 0 | 0 | 0 | 0 | 0 | 0 | 0 | 0 | 0 | 6 |
| $t_C'$ | 0 | 0 | 0 | 0 | 0 | 0 | 0 | 0 | 0 | 0 | 0 | 0 | 0 | 0 | 0 | 0 | 0 |

| | Q | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| $\beta'$ | 7 | 8 | 9 | 10 | 11 | 12 | 13 | 14 | 15 | 16 | 17 | 18 | 20 | 22 | 24 | 26 | 28 |
| $t_C'$ | 0 | 3 | 4 | 4 | 4 | 4 | 5 | 5 | 5 | 5 | 7 | 7 | 8 | 9 | 10 | 10 | 11 |

| | Q | | | | | | | | | | | | | | | | |
|---|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| $\beta'$ | 30 | 32 | 34 | 36 | 38 | 40 | 42 | 44 | 46 | 48 | 50 | 52 | 54 | 56 | 58 | 60 | 62 |
| $t_C'$ | 13 | 14 | 15 | 17 | 19 | 21 | 24 | 25 | 29 | 33 | 36 | 41 | 45 | 51 | 57 | 64 | 71 |

| | Q | | | | | | | | | | | | | | |
|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 |
| $\beta'$ | 64 | 66 | 68 | 70 | 72 | 74 | 76 | 78 | 80 | 82 | 84 | 86 | 88 | — | — |
| $t_C'$ | 80 | 89 | 100 | 112 | 125 | 141 | 157 | 177 | 198 | 222 | 250 | 280 | 314 | 352 | 395 |

8.8.3.6.2 Filtering Process for Luma Block Edges

...

Depending on the value of edgeType, the following applies:

If edgeType is equal to EDGE_VER, the following ordered steps apply:

...

3. When dE is equal to 3, for each sample location (xCb+xB1, yCb+yB1+k), k=0 . . . 3, the following ordered steps apply:
   a. The filtering process for a luma sample using long filters as specified in clause 8.8.3.6.7 is invoked with the sample values $p_{i,k}$, $q_{i,k}$ with i=0 . . . maxFilterLengthP and j=0 . . . maxFilterLengthQ, the locations $(xP_i, yP_i)$ set equal to (xCb+xB1−i−1, yCb+yB1+k) with i=0 . . . maxFilterLengthP−1 and $(xQ_j, yQ_j)$ set equal to (xCb+xB1+j, yCb+yB1+k) with j=0 . . . maxFilterLengthQ−1, the variables maxFilterLengthP, maxFilterLengthQ and $t_C$ as inputs and the filtered samples values $p_i'$ and $q_j'$ as outputs.
   b. The filtered sample values $p_i'$ with i=0 . . . maxFilterLengthP−1 replace the corresponding samples inside the sample array recPicture as follows:

$$recPicture[xCb+xB1-i-1][yCb+yB1+k]=p_i' \qquad (8\text{-}1116)$$

c. The filtered sample values $q_j'$ with j=0 . . . maxFilterLengthQ−1 replace the corresponding samples inside the sample array recPicture as follows:

$$recPicture[xCb+xB1+j][yCb+yB1+k]=q_j' \qquad (8\text{-}1117)$$

...

Otherwise (edgeType is equal to EDGE_HOR), the following ordered steps apply:

...

3. When dE is equal to 3, for each sample location (xCb+xB1+k, yCb+yB1), k=0 . . . 3, the following ordered steps apply:
   a. The filtering process for a luma sample using long filters as specified in clause 8.8.3.6.7 is invoked with the sample values $p_{i,k}$, $q_{i,k}$ with i=0 . . . maxFilterLengthP and j=0 . . . maxFilterLengthQ, the locations $(xP_i, yP_i)$ set equal to (xCb+xB1+k, yCb+yB1−i−1) with i=0 . . . maxFilterLengthP−1 and $(xQ_j, yQ_j)$ set equal to (xCb+xB1+k, yCb+yB1+j) with j=0 . . . maxFilterLengthQ−1, the variables maxFilterLengthP, maxFilterLengthQ, and the variable $t_C$ as inputs, and the filtered sample values $p_i'$ and $q_j'$ as outputs.
   b. The filtered sample values $p_i'$ with i=0 . . . maxFilterLengthP−1 replace the corresponding samples inside the sample array recPicture as follows:

$$recPicture[xCb+xB1+k][yCb+yB1-i-1]=p_i' \qquad (8\text{-}1122)$$

c. The filtered sample values q; with j=0 . . . maxFilterLengthQ−1 replace the corresponding samples inside the sample array recPicture as follows:

$$recPicture[xCb+xB1+k][yCb+yB1+j]=q_j' \qquad (8\text{-}1123)$$

...

8.8.3.6.5 Decision Process for a Luma Sample

Inputs to this process are:
the sample values $p_0$, p3, $q_0$ and q3,
the variables dpq, sp, sq, spq, sidePisLargeBlk, sideQisLargeBlk, β and $t_C$.

Output of this process is the variable dSam containing a decision.

The variables sp and sq are modified as follows:
When sidePisLargeBlk is equal to 1, the following applies:

$$sp=(sp+Abs(p_3-p_0)+1)>>1 \qquad (8\text{-}1158)$$

When sideQisLargeBlk is equal to 1, the following applies:

$$sq=(sq+Abs(q3-q_0)+1)>>1 \qquad (8\text{-}1159)$$

The variable sThr is derived as follows:
If sidePisLargeBlk is equal to 1 or sideQisLargeBlk is equal to 1, the following applies:

$$sThr=3*\beta>>5 \qquad (8\text{-}1160)$$

Otherwise, the following applies:

$$sThr=\beta>>3 \qquad (8\text{-}1161)$$

The variable dSam is specified as follows:
If all of the following conditions are true, dSam is set equal to 1:
dpq is less than (β>>2),
sp+sq is less than sThr,
spq is less than $(5*t_C+1)>>1$.
Otherwise, dSam is set equal to 0.

...

8.8.3.6.6 Filtering Process for a Luma Sample Using Short Filters

Inputs to this process are:
the sample values $p_i$ and $q_i$ with i=0 . . . 3,
the locations of $p_i$ and $q_i$, $(xP_i, yP_i)$ and $(xQ_i, yQ_i)$ with i=0 . . . 2,
a variable dE,
the variables dEp and dEq containing decisions to filter samples p1 and q1, respectively,
a variable $t_C$.

Outputs of this process are:
the number of filtered samples nDp and nDq,
the filtered sample values $p_i'$ and $q_j'$ with i=0 . . . nDp−1, j=0 . . . nDq−1. Depending on the value of dE, the following applies:

If the variable dE is equal to 2, nDp and nDq are both set equal to 3 and the following strong filtering applies:

$$p_0'=Clip3(p_0-3*t_C,p_0+3*t_C,(p2+2*p_1+2*p_0+2*q_0++4)>>3) \qquad (8\text{-}1162)$$

$$p_1'=Clip3(-2*t_C,p_1+2*t_C,(p2+p_1+p_0+q_0+2)>>2) \qquad (8\text{-}1163)$$

$$p2'=Clip3(p_2-1*t_C,p2+1*t_C,(2*p3+3*p2+p_1+p_0+q_0+4)>>3) \qquad (8\text{-}1164)$$

$$q_0'=Clip3(q_0-3*t_C,q_0+3*t_C,(p_1+2*p_0+2*q_0+2*+q2+4)>>3) \qquad (8\text{-}1165)$$

$$q_1'=Clip3(-2*t_C,+2*t_C,(p_0+q_0++q2+2)>>2) \qquad (8\text{-}1166)$$

$$q_2'=Clip3(q2-1*t_C,q2+1*t_C,(p_0+q_0++3*q2+2*q_3+4)>>3) \qquad (8\text{-}1167)$$

Otherwise, nDp and nDq are set both equal to 0 and the following weak filtering applies:
The following applies:

$$\Delta=(9*(q_0-p_0)-3*(q_1-p_1)+8)>>4 \qquad (8\text{-}1168)$$

When Abs(Δ) is less than $t_C*10$, the following ordered steps apply:
The filtered sample values $p_0'$ and $q_0'$ are specified as follows:

$$\Delta = \text{Clip3}(-t_C, t_C, \Delta) \qquad (8\text{-}1169)$$

$$p_0' = \text{Clip1}_Y(p_0 + \Delta) \qquad (8\text{-}1170)$$

$$q_0' = \text{Clip1}_Y(q_0 - \Delta) \qquad (8\text{-}1171)$$

When dEp is equal to 1, the filtered sample value $p_1'$ is specified as follows:

$$\Delta p = \text{Clip3}(-(t_C\!>\!>\!1), t_C\!>\!>\!1, (((p2+p_0+1)\!>\!>\!1) - p_1 + \Delta)\!>\!>\!1) \qquad (8\text{-}1172)$$

$$p_1' = \text{Clip1}_Y(p_1 + \Delta p) \qquad (8\text{-}1173)$$

When dEq is equal to 1, the filtered sample value $q_1'$ is specified as follows:

$$\Delta q = \text{Clip3}(-(t_C\!>\!>\!1), t_C\!>\!>\!1, (((q2+q_0+1)\!>\!>\!1) - q_1 - \Delta)\!>\!>\!1) \qquad (8\text{-}1174)$$

$$q_1' = \text{Clip1}_Y(q_1 + \Delta q) \qquad (8\text{-}1175)$$

nDp is set equal to dEp+1 and nDq is set equal to dEq+1.

When nDp is greater than 0 and one or more of the following conditions are true, nDp is set equal to 0:
cu_transquant_bypass_flag of the coding unit that includes the coding block containing the sample $p_0$ is equal to 1.
pred_mode_plt_flag of the coding unit that includes the coding block containing the sample $p_0$ is equal to 1.

When nDq is greater than 0 and one or more of the following conditions are true, nDq is set equal to 0:
cu_transquant_bypass_flag of the coding unit that includes the coding block containing the sample $q_0$ is equal to 1.
pred_mode_plt_flag of the coding unit that includes the coding block containing the sample $q_0$ is equal to 1.

8.8.3.6.7 Filtering Process for a Luma Sample Using Long Filters

Inputs to this process are:
the variables maxFilterLengthP and maxFilterLengthQ,
the sample values $p_i$ and $q_j$ with i=0 ... maxFilterLengthP and j=0 ... maxFilterLengthQ,
the locations of $p_i$ and $q_j$, $(xP_i, yP_i)$ and $(xQ_j, yQ_j)$ with i=0 ... maxFilterLengthP−1 and j=0 ... maxFilterLengthQ−1,
a variable $t_C$.

Outputs of this process are:
the filtered sample values $p_i'$ and $q_j'$ with i=0 ... maxFilterLengthP−1, j=0 ... maxFilterLenghtQ−1.

The variable refMiddle is derived as follows:
If maxFilterLengthP is equal to maxFilterLengthQ and maxFilterLengthP is equal to 5, the following applies:

$$\text{refMiddle} = (p4+p3+2*(p2+p_1+p_0+q_0+q_1+q2)+q3+q4+8)\!>\!>\!4 \qquad (8\text{-}1176)$$

Otherwise, if maxFilterLengthP is equal to maxFilterLengthQ and maxFilterLengthP is not equal to 5, the following applies:

$$\text{refMiddle} = (p6+p5+p4+p3+p2+p_1+2*(p_0+q_0)+q_1+q2+q3+q4+q5+q6+8)\!>\!>\!4 \qquad (8\text{-}1177)$$

Otherwise, if one of the following conditions are true,
maxFilterLengthQ is equal to 7 and maxFilterLengthP is equal to 5,
maxFilterLengthQ is equal to 5 and maxFilterLengthP is equal to 7,
the following applies:

$$\text{refMiddle} = (p4+p3+2*(p2+p_1+p_0+q_0+q_1+q2)+q3+q4+8)\!>\!>\!4 \qquad (8\text{-}1178)$$

Otherwise, if one of the following conditions are true,
maxFilterLengthQ is equal to 5 and maxFilterLengthP is equal to 3,
maxFilterLengthQ is equal to 3 and maxFilterLengthP is equal to 5,
the following applies:

$$\text{refMiddle} = (p3+p2+p_1+p_0+q_0+q_1+q_2+q_3+4)\!>\!>\!3 \qquad (8\text{-}1179)$$

Otherwise, if maxFilterLengthQ is equal to 7 and maxFilterLengthP is equal to 3, the following applies:

$$\text{refMiddle} = (2*p_2+p_1+p_0+q_0)+p_0+p_1+q_1+q_2+q_3+q_4+q_5+q_6+8)\!>\!>\!4 \qquad (8\text{-}1180)$$

Otherwise, the following applies:

$$\text{refMiddle} = (p_6+p_5+p_4+p_3+p_2+p_1+2*(q_2+q_1+q_0+p_0)+q_0+q_1+8)\!>\!>\!4 \qquad (8\text{-}1181)$$

The variables refP and refQ are derived as follows:

$$\text{refP} = (p_{maxFilterLengthP}+p_{maxFilterLengthP-1}+1)\!>\!>\!1 \qquad (8\text{-}1182)$$

$$\text{refQ} = (q_{maxFilterLengthQ}+q_{maxFilterLengthQ-1}+1)\!>\!>\!1 \qquad (8\text{-}1183)$$

The variables $f_i$ and $t_CPD_i$ are defined as follows: If maxFilterLengthP is equal to 7, the following applies:

$$f_{0...6} = \{59, 50, 41, 32, 23, 14, 5\} \qquad (8\text{-}1184)$$

$$t_CPD_{0...6} = \{6, 5, 4, 3, 2, 1, 1\} \qquad (8\text{-}1185)$$

Otherwise, if maxFilterLengthP is equal to 5, the following applies:

$$f_{0...4} = \{58, 45, 32, 19, 6\} \qquad (8\text{-}1186)$$

$$t_CPD_{0...4} = \{6, 5, 4, 3, 2\} \qquad (8\text{-}1187)$$

Otherwise, the following applies:

$$f_{0...2} = \{53, 32, 11\} \qquad (8\text{-}1188)$$

$$t_CPD_{0...2} = \{6, 4, 2\} \qquad (8\text{-}1189)$$

The variables $g_j$ and $t_CQD_3$ are defined as follows:
If maxFilterLengthQ is equal to 7, the following applies:

$$g_{0...6} = \{59, 50, 41, 32, 23, 14, 5\} \qquad (8\text{-}1190)$$

$$t_CQD_{0...6} = \{6, 5, 4, 3, 2, 1, 1\} \qquad (8\text{-}1191)$$

Otherwise, if maxFilterLengthQ is equal to 5, the following applies:

$$g_{0...4} = \{58, 45, 32, 19, 6\} \qquad (8\text{-}1192)$$

$$t_CQD_{0...4} = \{6, 5, 4, 3, 2\} \qquad (8\text{-}1193)$$

Otherwise, the following applies:

$$g_{0...2} = \{53, 32, 11\} \qquad (8\text{-}1194)$$

$$t_CQD_{0...2} = \{6, 4, 2\} \qquad (8\text{-}1195)$$

The filtered sample values $p_i'$ and $q_j'$ with i=0 ... maxFilterLengthP−1 and j=0 ... maxFilterLengthQ−1 are derived as follows:

$$q_j' = \text{Clip3}(-(t_C*t_CPD_i)\!>\!>\!1, p_i+(t_C*t_CPD_i)\!>\!>\!1, (\text{refMiddle}*f_i+\text{refP}*(64-f_i)+32)\!>\!>\!6) \qquad (8\text{-}1196)$$

$$q_j' = \text{Clip3}(q_j-(t_C*t_CQD_j)\!>\!>\!1, q_j+(t_C*t_CQD_j)\!>\!>\!1, (\text{refMiddle}*g_j+\text{refQ}*(64-g_j)+32)\!>\!>\!6) \qquad (8\text{-}1197)$$

When one or more of the following conditions are true, the filtered sample value, p is substituted by the corresponding input sample value $p_i$ with i=0 . . . maxFilterLengthP−1:

cu_transquant_bypass_flag of the coding unit that includes the coding block containing the sample $p_i$ is equal to 1.

pred_mode_plt_flag of the coding unit that includes the coding block containing the sample $p_i$ is equal to 1.

When one or more of the following conditions are true, the filtered sample value, $q_i'$ is substituted by the corresponding input sample value $q_j$ with j=0 . . . maxFilterLengthQ−1:

cu_transquant_bypass_flag of the coding unit that includes the coding block containing the sample $q_i$ is equal to 1.

pred_mode_plt_flag of the coding unit that includes the coding block containing the sample $q_i$ is equal to 1.

. . .

——End Excerpt——

SUMMARY

Certain challenges exist. For example, the long filter decision for 7 sample filtering on one or two sides does not take into consideration either sample p6 for block P or q6 for block Q, and this can enable the long filtering notwithstanding the fact that such long filtering will reduce image quality (e.g., destroy a natural texture) by modifying p6 and/or q6.

Here follow's examples of sample values across a boundary between block P (p0 to p7) and block Q (q0 to q7), where p0 and q0 are adjacent to the boundary, that the current long filter decisions totally ignore and thus may apply deblocking that removes natural texture:

Samples: p7 p6 p5 p4 p3 p2 p1 p0|q0 q1 q2 q3 q4 q5 q6 q7

A peak in sample p6 or q6 where p6 and q6 is larger or smaller than neighboring samples as shown in example 1 cannot be detected.

Example 1 10 0 10 10 10 10 10 10|10 10 10 10 10 10 0 10

A peak in sample p5 or q5 where p4, p5, p6, q4, q5 and q6 are larger or smaller than neighboring samples as shown in example 2 cannot be detected.

Example 2 10 20 30 20 10 10 10 10|10 10 10 10 20 30 20 10

To overcome this problem, this disclosure proposes embodiments where the long filter decision in VVC is modified by adding at least one gradient check that at least includes sample p6 or q6. This makes it possible to avoid using the long filters when there is some natural structure at sample p6 or q6. In one specific embodiment at least two gradient checks including both q6 and p6 are added. In another embodiment, the dpq threshold is modified from beta>>2 to beta>>4. This threshold change embodiment may be used in conjunction with or instead of the embodiment in which a gradient check that includes p6 and/or q6 is added to the long filter decision. An advantage of the proposed embodiments is that they increase the quality of the image displayed to the user (e.g., it avoids removing narrow lines or blurring narrow lines).

Accordingly, in one aspect there is provided a method (400) for filtering sample values associated with an image. The method includes obtaining (s402) a first set of sample values comprising a first block of sample values and a second block of sample values, wherein the first block of sample values comprises a set of sample values B1_i,k for i=0-7 and k=0-3, and the second block of sample values comprises a set of sample values B2_i,k for i=0-7 and k=0-3. The method also includes deciding (s404) whether or not to use a long filter to filter at least a subset of the first set of sample values. Deciding whether or not to use a long filter to filter at least a subset of the first set of sample values comprises: calculating (s502) a first gradient value, maxGradB1_6,0, using sample value B1_6,0; calculating (s504) a first pq value, pq1_0, using maxGradB1_6,0; and comparing (s508) pq1_0 to a threshold. In another aspect there is provided an apparatus configured to perform this method.

In another aspect there is provided a method (400) for filtering sample values associated with an image. The method includes obtaining (s402) a first set of sample values comprising a first block of sample values and a second block of sample values, wherein the first block of sample values comprises a set of sample values B1_i,k for i=0-7 and k=0-3, and the second block of sample values comprises a set of sample values B2_i,k for i=0-7 and k=0-3. The method also includes selecting (s404) a filter. Selecting the filter comprises calculating (s504) a first pq value, pq2_0, using at least a first value equal to Abs(B1_2,0−2*B1_1,0+B1_0,0) and a second value equal to Abs(B2_2,0−2*B2_1,0+B2_0,0); and comparing (s508) pq2_0 to a threshold, wherein the threshold is equal to (3>>4, and β is selected from a set of predetermined beta values based on a quantization parameter value, Q. In another aspect there is provided an apparatus configured to perform this method.

In another aspect there is provided a method for filtering sample values associated with an image. The method includes obtaining (s402) a first set of sample values comprising a first block of sample values and a second block of sample values, wherein the first block of sample values comprises a set of sample values B1_i,k for i=0-7 and k=0-3, and the second block of sample values comprises a set of sample values B2_i,k for i=0-7 and k=0-3. The method also includes selecting (s404) a filter. Selecting the filter comprises: i) calculating a first pq value, pq1_0, wherein calculating pq1_0 comprises calculating a value sp, calculating a value sq, and calculating sp+sq, wherein pq1_0=(sp+sq); ii) comparing pq1_0 to a first threshold; iii) calculating (s504) a second pq value, pq2_0, using at least a first value equal to Abs(B1_2,0−2*B1_1,0+B1_0,0) and a second value equal to Abs(B2_2,0−2*B2_1,0+B2_0,0); and iv) comparing (s508) pq2_0 to a second threshold, wherein the second threshold is equal to β>>>4, and β is selected from a set of predetermined beta values based on a quantization parameter value, Q. In another aspect there is provided an apparatus configured to perform this method.

DETAILED DESCRIPTION

The embodiments described herein can be used in a video encoder or video decoder to deblock vertical and/or horizontal block boundaries. It also applies to an image encoder or image decoder to deblock vertical and/or horizontal block boundaries.

Figure 1:
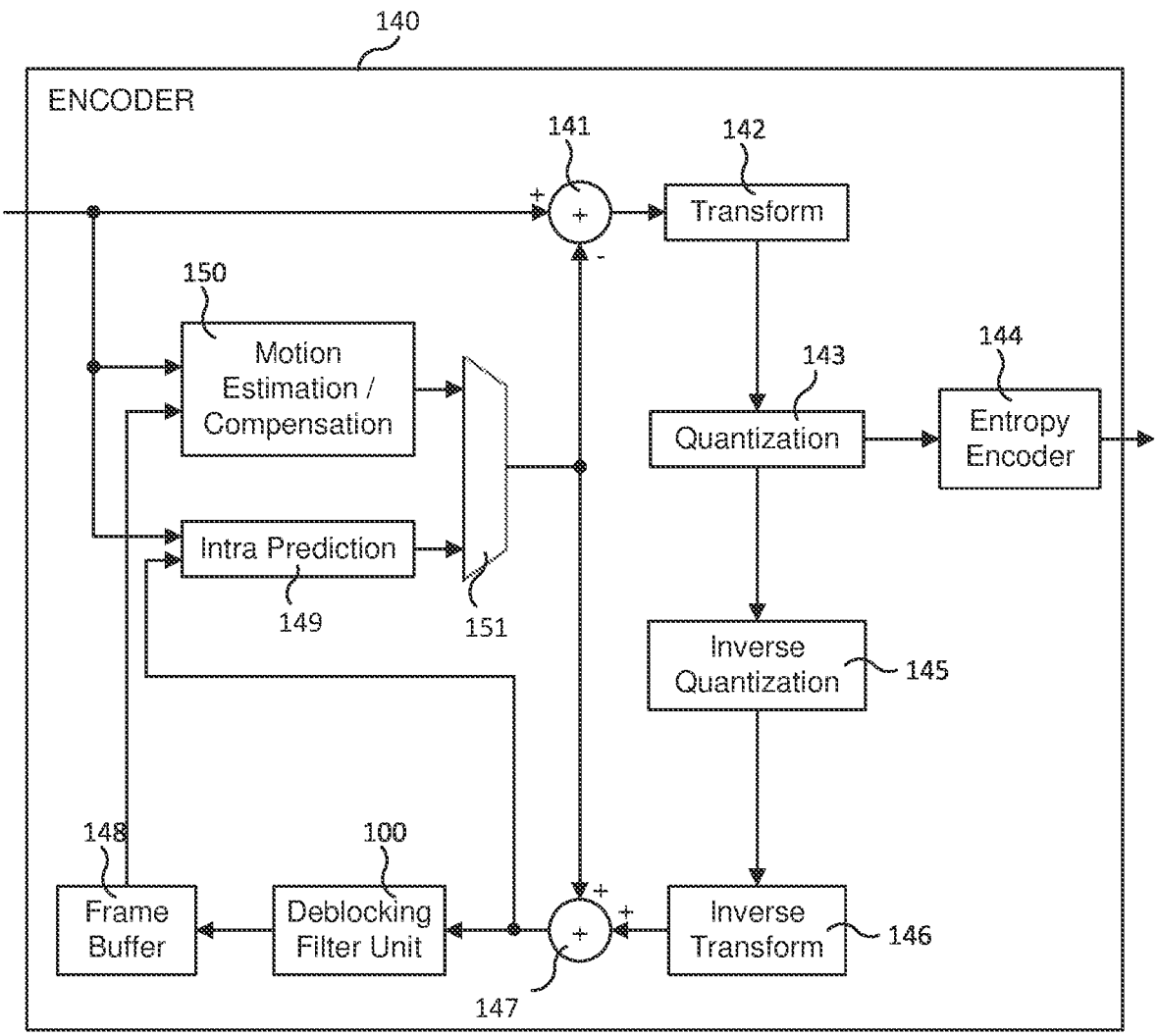
FIG. 1 is a schematic block diagram of a video encoder according to an embodiment.

FIG. 1 is a schematic block diagram of a video encoder 140 to encode a block of pixels in a video image (also referred to as a frame) of a video sequence according to some embodiments.

A current block of pixels is predicted by performing a motion estimation using motion estimator 150 from an already provided block of pixels in the same frame or in a previous frame. The result of the motion estimation is a motion or displacement vector associated with the reference block, in the case of inter prediction. The motion vector may be used by motion compensator 150 to output an inter prediction of the block of pixels.

Intra predictor 149 computes an intra prediction of the current block of pixels. The outputs from the motion estimator/compensator 150 and the intra predictor 149 are input in selector 151 that either selects intra prediction or inter prediction for the current block of pixels. The output from the selector 151 is input to an error calculator in the form of adder 141 that also receives the pixel values of the current block of pixels. Adder 141 calculates and outputs a residual error as the difference in pixel values between the block of pixels and its prediction.

The error is transformed in transformer 142, such as by a discrete cosine transform, and quantized by quantizer 143 followed by coding in encoder 144, such as by entropy encoder. In inter coding, also the estimated motion vector is brought to encoder 144 to generate the coded representation of the current block of pixels.

The transformed and quantized residual error for the current block of pixels is also provided to an inverse quantizer 145 and inverse transformer 146 to retrieve the original residual error. This error is added by adder 147 to the block prediction output from the motion compensator 150 or intra predictor 149 to create a reference block of pixels that can be used in the prediction and coding of a next block of pixels. This new reference block is first processed by a deblocking filter 100 according to examples/embodiments discussed below to perform deblocking filtering to reduce/combat blocking artifacts. The processed new reference block is then temporarily stored in frame buffer 148, where it is available to intra predictor 149 and motion estimator/compensator 150.

Figure 2:
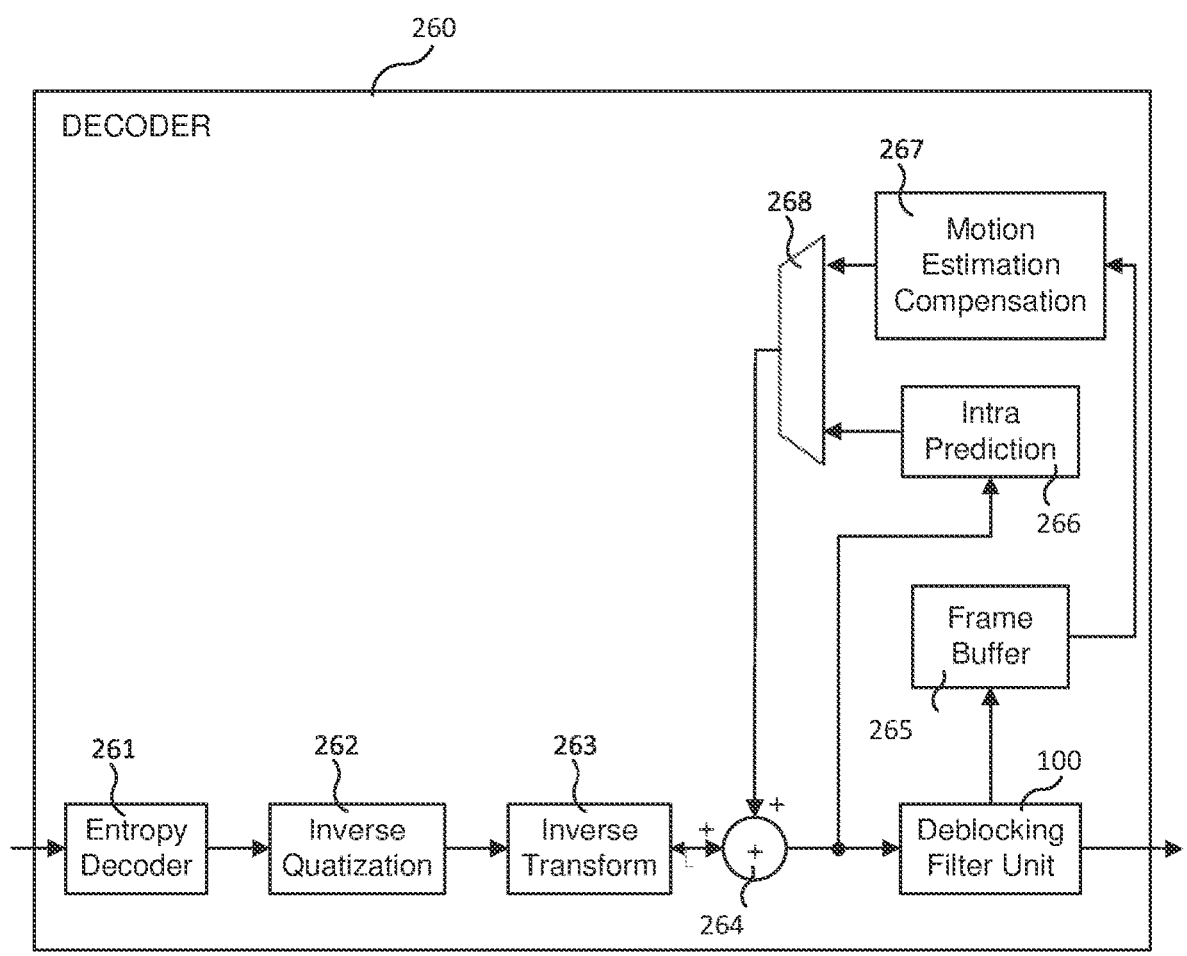
FIG. 2 is a schematic block diagram of a video decoder according to an embodiment.

FIG. 2 is a corresponding schematic block diagram of a video decoder 260 including deblocking filter 100 according to some embodiments. Decoder 260 includes decoder 261, such as entropy decoder, to decode an encoded representation of a block of pixels to get a set of quantized and transformed residual errors. These residual errors are dequantized by inverse quantizer 262 and inverse transformed by inverse transformer 263 to provide a set of residual errors.

These residual errors are added by adder 264 to the pixel values of a reference block of pixels. The reference block is determined by a motion estimator/compensator 267 or intra predictor 266, depending on whether inter or intra prediction is performed. Selector 268 is thereby interconnected to adder 264 and motion estimator/compensator 267 and intra predictor 266. The resulting decoded block of pixels output form adder 264 is input to deblocking filter 100 according to some embodiments of inventive concepts to provide deblocking filtering of blocking artifacts. The filtered block of pixels is output from decoder 260 and may be furthermore temporarily provided to frame buffer 265 to be used as a reference block of pixels for a subsequent block of pixels to be decoded. Frame buffer 265 is thereby connected to motion estimator/compensator 267 to make the stored blocks of pixels available to motion estimator/compensator 267.

The output from adder 264 may also be input to intra predictor 266 to be used as an unfiltered reference block of pixels.

In embodiments of FIG. 1 and FIG. 2, deblocking filter 100 may perform deblocking filtering as so called in-loop filtering. In alternative embodiments at decoder 260, deblocking filter 100 may be arranged to perform so called post-processing filtering. In such a case, deblocking filter 100 operates on the output frames outside of the loop formed by adder 264, frame buffer 265, intra predictor 266, motion estimator/compensator 267, and selector 268. In such embodiments, no deblocking filtering is typically done at the encoder. Operations of deblocking filter 100 will be discussed in greater detail below.

When the maximum number of samples that can be modified on at least one side of the block boundary is determined to be 7 samples and the boundary strength is determined to be larger than 0 for one line of samples, a long filter decision is based on determining a gradient value (denoted "magGradp6") (e.g., the magnitude of a gradient) using sample value p6 in block P if maxFilterLengthP is equal to 7 and based on determining a gradient value (denoted "magGradq6") using sample value q6 in block Q if maxFilterLengthQ is equal to 7.

In one embodiment, calculating magGradp6 comprises calculating magGradp6 using p6 and using at least one of p3, p4, p5, and p'7, and calculating magGradq6 comprises calculating magGradq6 using q6 and using at least one of q3, q4, q5, and q7.

Alternative 1

The magGradp6 value is added to other gradient computations including at least sample p0, p3 and p7. For example, a value sp is calculated as:

$sp=(Abs(p0-p3)+Abs(p3-p7)+magGradp6+1)>>1$

The magGradq6 value is added to other gradient computations including at least sample q0, q3 and q7. For example, a value sq is calculated as:

$sq=(Abs(q0-q3)+Abs(q3-q7)+magGradq6+1)>>1.$

A value spq may then be computed where spq=sp+sq.

$dp=(Abs(p0-2*p1+p2)+Abs(p3-2*p4+p5)+1)>>1.$ $dq=(Abs(q0-2*q1+q2)+Abs(q3-2*q4+q5)+1)>>1.$

Alternative 2

The magGradp6 value replaces the magnitude computed for the case of maxFilterLengthP equal to 5 as follows:

If maxFilterLengthP==7, then $dp=(Abs(p0-2*p1+p2)+magGradp6+1)>>1$, otherwise $dp=(Abs(p0-2*p1+p2)+Abs(p3-2*p4+p5)+1)>>1.$ The magGradq6 value replaces the magnitude computed for the case of maxFilterLengthQ equal to 5 as follows:
If maxFilterLengthQ==7, then $$dq=(\text{Abs}(q0-2*q1+q2)+\text{magGradq6+1})\gg 1, \text{otherwise}$$

$$dq=(\text{Abs}(q0-2*q1+q2)+\text{Abs}(q3-2*q4+q5)+1)\gg 1.$$

A value, dpq, is then computed as dpq=dq+dp.

For either alternative 1 or alternative 2 above, in one embodiment it is decided to use a long filter if all of the following three conditions are TRUE:

$$spq<\text{threshold}), \tag{1}$$

$$2*dpq<\text{threshold2, and} \tag{2}$$

$$(\text{Abs}(p0-q0)<\text{threshold3}.$$

If one or more of the above conditions is not true, then the long filter is not applied and maxFilterLengthP and maxFilterLengthQ are equal to 3 or less.

In one embodiment, threshold)=sThr (e.g., (3*beta)>>5).

In one embodiment, threshold2=beta>>2, where beta depends on a quantization parameter value, Q, as shown above in table 8-18.

In one embodiment, threshold3=(5*tC+1)>>1, where tC depends on a quantization parameter value, Q, as shown above in table 8-18.

For either alternative 1 or alternative 2 above, in one embodiment magGradp6 is determined as: Abs(p6-p7), and magGradq6 is determined as: Abs(q7-q6).

In another embodiment, magGradp6 is equal to Abs(p4-p5-p6+p7) and magGradq6 is equal to Abs(q7-q5-q6+q4). One benefit of this embodiment compared to embodiment with gradient determined from difference between two samples is that this approach to determine the magnitude of the gradient do not increase sensitive to a ramp, a slope with increasing or decreasing values from p0 to p7 or from q0 to q7.

In another embodiment, magGradp6 is equal to Abs(p4-2*p5+p6) and magGradq6 is equal to Abs(q6-2*q5+q4). One benefit of this embodiment compared to embodiment with gradient determined from difference between two samples is that this approach to determine the magnitude of the gradient do not increase sensitive to a ramp, a slope with increasing or decreasing values from p0 to p7 or from q0 to q7.

For alternative 1, the specification Section 8.8.3.6.1 equations 8-1081, 8-1082, 8-1084, and 8-1085 may be modified as follows:

$$sp0=\text{maxFilterLengthP}==7?\text{Abs}(p3,0-p0,0)+\text{magGradp6\_0}: \text{Abs}(p3,0-p0,0) \tag{8-1081},$$

$$sq0=\text{maxFilterLengthQ}==7?\text{Abs}(q0,0-q3,0)+\text{magGradq6\_0}: \text{Abs}(q0,0-q3,0) \tag{8-1082},$$

$$sp3=\text{maxFilterLengthP}==7?\text{Abs}(p3,3-p0,3)+\text{magGradp6\_3}: \text{Abs}(p3,3-p0,3) \tag{8-1084},$$

$$sq3=\text{maxFilterLengthQ}==7?\text{Abs}(q0,3-q3,3)+\text{magGradq6\_3}: \text{Abs}(q0,3-q3,3) \tag{8-1085},$$

where magGradp6_0=Abs(p7,0-p6,0) or Abs(p7,0-p6,0-p5,0+p4,0) or Abs(p6,0-2*p5,0+p4,0);

magGradp6_3=Abs(p7,3-p6,3) or Abs(p7,3-p6,3-p5,3+p4,3) or Abs(p6,3-2*p5,3+p4,3);

magGradq6_0=Abs(q6,0-q7,0) or Abs(q4,0-q6,0-q5,0+q7,0) or Abs(q4,0-2*q5,0+q6,0); and magGradq6_3=Abs(q6,3-q7,3) or Abs(q4,3-q6,3-q5,3+q7,3) or Abs(q4,3-2*q5,3+q6,3).

For alternative 2, the specification Section 8.8.3.6.1 equations 8-1087, 8-1088, 8-1092, and 8-1093 may be modified as follows:

$$dp0L=(dp0+(\text{maxFilterLengthP}==7?\text{magGradp6\_0}: \text{Abs}(p5,0-2*p4,0+p3,0))+1)\gg 1 \tag{8-1087},$$

$$dp3L=(dp3+(\text{maxFilterLEngthP}==7?\text{magGradp6\_3}: \text{Abs}(p5,3-2*p4,3+p3,3))+1)\gg 1 \tag{8-1088},$$

$$dq0L=(dq0+(\text{maxFilterLEngthQ}==7?\text{magGradq6\_0}: \text{Abs}(q5,0-2*q4,0+q3,0))+1)\gg 1 \tag{8-1092},$$

$$dq3L=(dq3+(\text{maxFilterLengthQ}==7?\text{magGradq6\_3}: \text{Abs}(q5,3-2*q4,3+q3,3))+1)\gg 1 \tag{8-1093}, \text{where}$$

magGradp6_0=Abs(p7,0-p6,0-p5,0+p4,0) or Abs(p6,0-2*p5,0+p4,0);

magGradp6_3=Abs(p7,3-p6,3-p5,3+p4,3) or Abs(p6,3-2*p5,3+p4,3);

magGradq6_0=Abs(q4,0-q6,0-q5,0+q7,0) or Abs(q4,0-2*q5,0+q6,0); and magGradq6_3=Abs(q4,3-q6,3-q5,3+q7,3) or Abs(q4,3-2*q5,3+q6,3).

In another embodiment, the dpq threshold (a.k.a., "threshold2" is modified such that threshold2 is equal to beta>>4, instead of being equal to beta>>2. In this embodiment Section 8.8.3.6.5 is modified as follows:
The variable sThr1 and sThr2 are derived as follows:—
If sidePisLargeBlk is equal to 1 or sideQisLargeBlk is equal to 1, the following applies:

$$s\text{Thr1}=\beta*\beta\gg 5 \tag{8-1160}$$

$$s\text{Thr2}=\beta\gg 4 \tag{8-1160b}$$

Otherwise, the following applies:

$$s\text{Thr1}=\beta\gg 3 \tag{8-1161}$$

$$s\text{Thr2}=\beta\gg 2 \tag{8-1161b}$$

The variable dSam is specified as follows:
If all of the following conditions are true, dSam is set equal to 1:
dpq is less than sThr2,
sp+sq is less than sThr1,
spq is less than (5*$t_C$+1)>>1.
Otherwise, dSam is set equal to 0.

In another embodiment, the dqp threshold modification also applies to the strong/weak filter decision. In this embodiment Section 8.8.3.6.5 is modified as follows:
The variable sThr1 and sThr2 are derived as follows:
If sidePisLargeBlk is equal to 1 or sideQisLargeBlk is equal to 1, the following applies:

$$s\text{Thr1}=3*\beta\gg 5 \tag{8-1160}$$

$$s\text{Thr2}=\beta\gg 4 \tag{8-1160b}$$

Otherwise, the following applies:

$$s\text{Thr1}=\gamma\gg 3 \tag{8-1161}$$

$$s\text{Thr2}=\beta\gg 4 \tag{8-1161b}$$

The variable dSam is specified as follows:
If all of the following conditions are true, dSam is set equal to 1:
  dpq is less than sThr2,
  sp+sq is less than sThr1,
  spq is less than $(5*t_C+1)>>1$.
Otherwise, dSam is set equal to 0.

Figure 4:
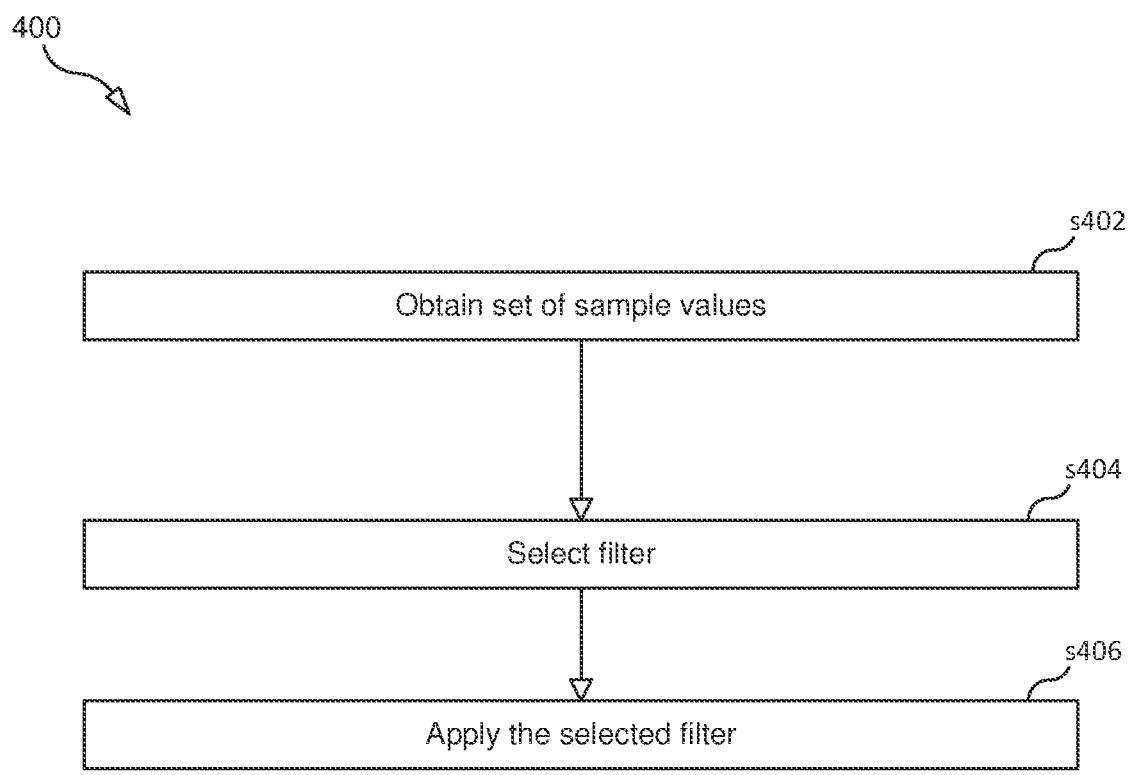
FIG. 4 is a flowchart illustrating a process according to an embodiment.

FIG. 4 is a flowchart illustrating a process 400 according to some embodiments. Process 400 may begin in step s402.

Figure 3:
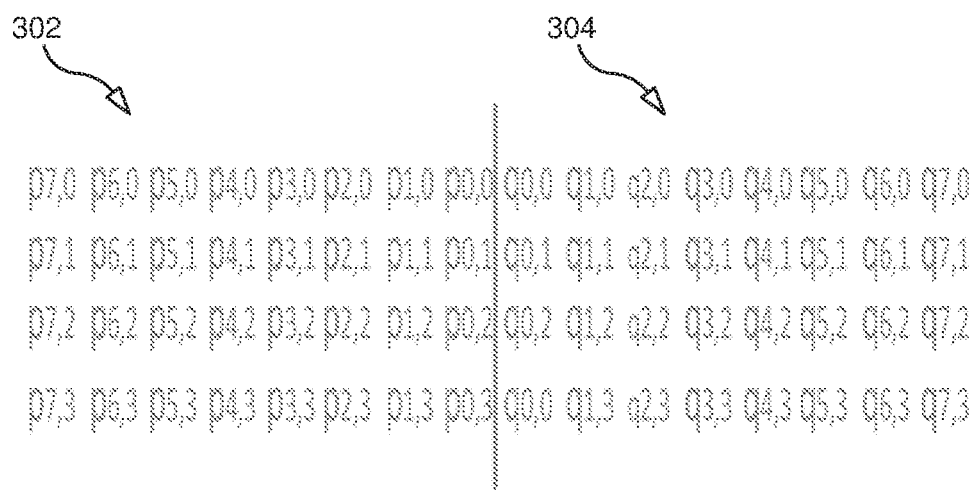
FIG. 3 illustrates a boundary between a first block (denoted a P block) and a second block (denoted a Q block).

Step s402 comprises obtaining a first set of sample values. In one embodiment the first set of sample values comprises a first block of sample values (e.g., block 302) (hereafter referred to as the P block) and a second block of sample values (e.g., block 304) (hereafter referred to as the Q block). In one embodiment, as shown in FIG. 3, the P block comprises a set of sample values pi,k for i=0 to 7 and k=0 to 3, and the q block comprises a set of sample values qi,k for i=0 to 7 and k=0 to 3.

Step s404 comprises selecting a filter to use to filter at least a subset of the first set of sample values (e.g., sample values pi,k for i=0 to 7 and k=0 to 3 and/or sample values qi,k for i=0 to 7 and k=0 to 3). For example, step s404 may comprise deciding whether or not to use a long filter to filter at least a subset of the first set of sample values or deciding whether or not to use a strong filtering should apply (see e.g., VVC specification at 8.8.3.6.6).

Step s406 comprises applying the selected filter.

Figure 5:
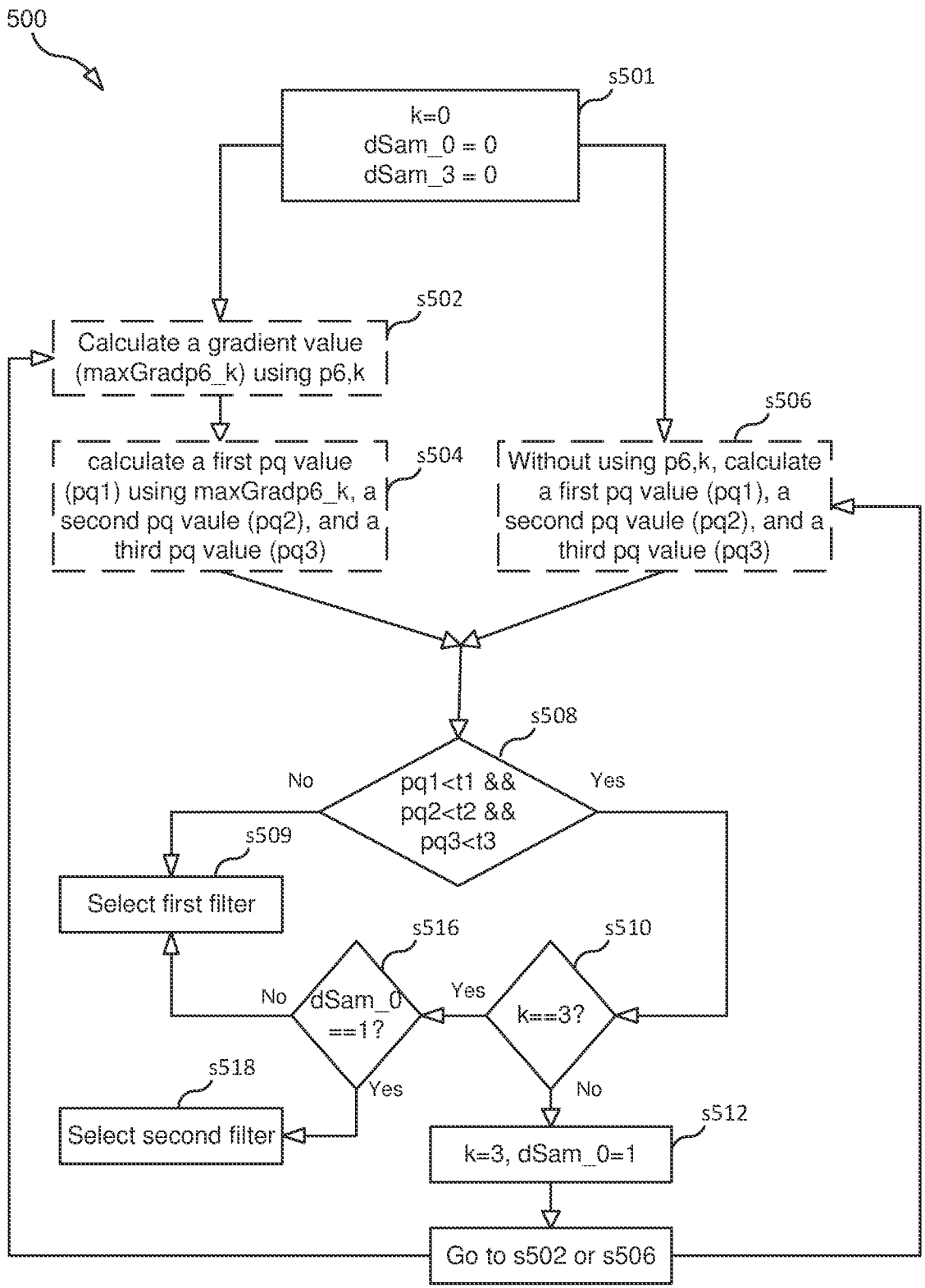
FIG. 5 is a flowchart illustrating a process according to an embodiment.

FIG. 5 is a flowchart illustrating a process 500 according to one embodiment for performing step s404. Process 500 may begin in step s501. Step s501 comprises initializing three variables: k, dSam_0, and dSam_3, where all of these variables are initialized to 0.

After step s501, process 500 may include performing steps s502 and s504 or instead performing step s506. Steps s502 an s504 are performed with the assumption that max-FilterLengthP=7.

Step s502 comprises calculating a first gradient value, maxGradp6_k, using sample value p6,k. For example, calculating maxGradp6_k includes: calculating Abs(p7,k−p6,k) or calculating Abs(p7,k−p6,k−p5,k+p4,k) or calculating Abs(p6,k−2*p5,k+p4,k).

Step s504 comprises calculating three pq values (pq1, pq2, and pq3), wherein at least pq1 is calculated using maxGradp6_k.

For example, in one embodiment calculating pq1 comprises calculating a value sp+sq, wherein calculating sp comprises calculating sp=(Abs(p0,k−p3,k)+Abs(p3,k−p7,k)+magGradp6 k+1)>>1. Calculating sq may comprise calculating: (Abs(q0,k−q3,k)+Abs(q3,k−q7,k)+magGradq6 k+1)>>1, where magGradq6 k equals: Abs(q7,k−q6,k) or Abs(q7,k−q6,k−q5,k+q4,k) or Abs(q6,k−2*q5,k+q4,k).

In another embodiment, calculating pq1 comprises calculating 2*(dp+dq), wherein calculating dp comprises calculating dp=(Abs(p0,k−2*p1,k+p2,k)+magGradp6_k+1)>>1. Calculating dq may comprise calculating: (Abs(q0,k−2*q1,k+q2,k)+magGradq6_k+1)>>1.

Step s506 comprises calculating the three pq values (pq1, pq2, and pq3) without using maxGradp6 k (i.e., without using sample value p6,k). In one embodiment, pq1=sp+sq; pq2=dpq; and pq3=Abs(p0,k−q0,k)

Step s508 comprises: i) comparing pq1 to a first threshold (t1), ii) comparing pq2 to a second threshold (t2), and iii) comparing pq3 to a third threshold (t3).

If pq1 is less than t1, and pq2 is less than t2, and pq3 is less than t3, then process 500 proceeds to step s510, otherwise it proceeds to step s509 (i.e., a first filter is selected (e.g., short filtering is applied)).

Step s510 comprises checking whether k equals 3. If k is not equal to 3, then process 500 proceeds to step s512, otherwise it proceeds to step s516. In step s512, k is set equal to 3 and dSam_0 is set to 1. After step s512, process returns to either step s502 or s506. Step s516 comprises checking whether dSam_0 is equal to 1. If it is not, process 500 goes to step s509, otherwise process 500 goes to step s518 (i.e., a second filter is selected (e.g., long filtering is applied)).

In an embodiment where step s506 is performed instead of steps s502 and s504, pq1 is equal to 2*(dp+dq), where $$dp=(Abs(p0-2*p1+p2)+Abs(p5-2*p4+p3)+1)>>1,$$
and $$dq=(Abs(q0-2*q1+q2)+Abs(q5-2*q4+q3)+1)>>1.$$

In such an embodiment, the first threshold (t1) may be equal to beta>>4.

Figure 6:
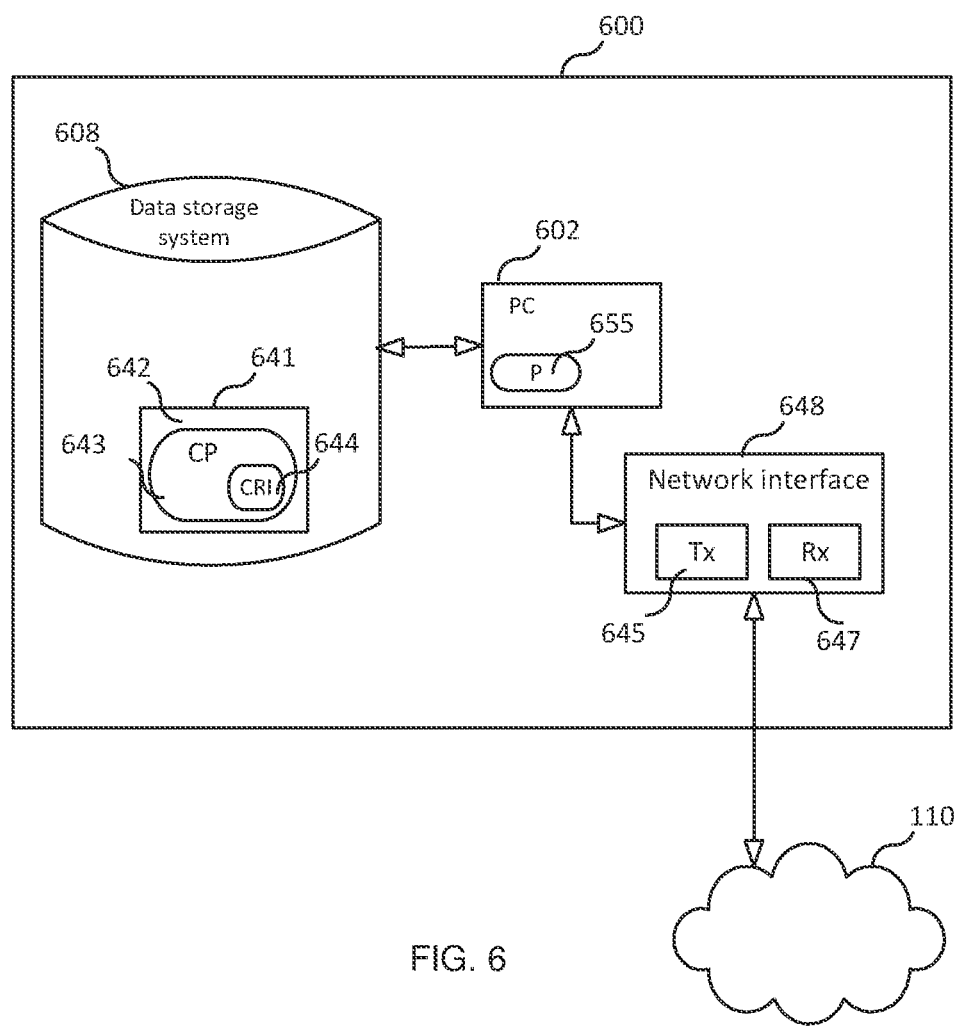
FIG. 6 is a block diagram of an apparatus according to an embodiment.

FIG. 6 is a block diagram of an apparatus 600, according to some embodiments, for implementing the video encoder 140 or the video decoder 260. As shown in FIG. 6, apparatus 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 600 may be a distributed computing apparatus); a network interface 648 comprising a transmitter (Tx) 645 and a receiver (Rx) 647 for enabling apparatus 600 to transmit data to and receive data from other nodes connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

Figure 7:
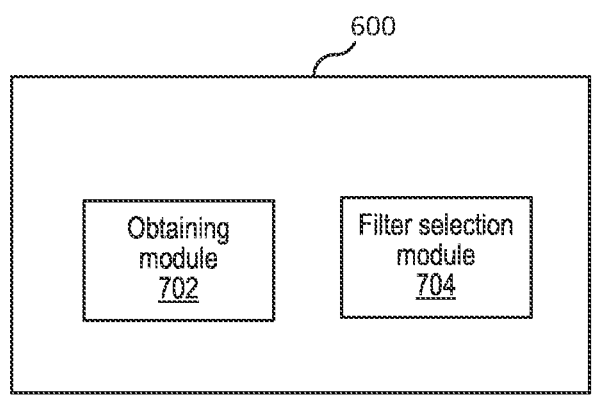
FIG. 7 a functional block diagram of an apparatus according to an embodiment.

FIG. 7 is a functional block diagram of apparatus 600 according to some other embodiments. The apparatus 600 includes a obtaining module 702 and a filter selection module 704. The obtaining module 702 is adapted to obtain a first set of sample values comprising a first block of sample values (hereafter referred to as the P block) and a second block of sample values (hereafter referred to as the Q block), wherein the P block comprises a set of sample values pi,k for i=0-7 and k=0-3, and the Q block comprises a set of sample values qi,k for i=0-7 and k=0-3.

In one embodiment, the filter selection module is adapted to decide whether or not to use a long filter to filter at least a subset of the first set of sample values, wherein the filter selection module is configured to decide whether or not to use a long filter to filter at least a subset of the first set of sample values by performing a process that includes: calculating a first gradient value, maxGradp6_0, using sample value p6,0; calculating a first pq value, pq1_0, using maxGradp6_0; and comparing pq1_0 to a threshold.

In another embodiment, the filter selection module is adapted to select a filter, wherein the filter selection module 704 is configured to select a by performing a process that includes: calculating a first pq value, pq1, using at least a first value equal to Abs(p2,0−2*p1,0+p0,0) and a second value equal to Abs(q2,0−2*q1,0+q0,0); and comparing pq1 to a threshold, wherein the threshold is equal to β>>4, and β is selected from a set of predetermined beta values based on a quantization parameter value, Q.

Concise Description of Some Embodiments

A1. A method (400) for filtering sample values associated with an image, the method comprising: obtaining (s402) a first set of sample values comprising a first block of sample values (hereafter referred to as the P block) and a second block of sample values (hereafter referred to as the Q block), wherein the P block comprises a set of sample values pi,k for i=0-7 and k=0-3, and the Q block comprises a set of sample values qi,k for i=0-7 and k=0-3; and deciding (s404) whether or not to use a long filter to filter at least a subset of the first set of sample values, wherein deciding whether or not to use a long filter to filter at least a subset of the first set of sample values comprises: calculating (s502) a first gradient value, maxGradp6_0, using sample value p6,0; calculating (s504) a first pq value, pq1_0, using maxGradp6_0; and comparing (s508) pq1_0 to a threshold.

A2. The method of embodiment A1, wherein deciding whether or not to use a long filter to filter at least a subset of the first set of sample values further comprises: calculating a second gradient value, maxGradp6_3, using sample value p6,3, calculating a second pq value, pq1_3, using maxGradp6_3, and comparing (s508) pq1_3 to a threshold.

A3. The method of embodiment A1 or A2, wherein calculating pq1_0 comprises calculating a value sp+sq, wherein calculating sp comprises calculating sp=(Abs(p0,0−p3,0)+Abs(p3,0−p7,0)+magGradp6_0+1)>>1.

A4. The method of embodiment A3, wherein magGradp6_0 equals Abs(p7,0−p6,0), magGradp6_0 equals Abs(p7,0−p6,0−p5,0+p4,0), or magGradp6_0 equals Abs(p6,0−2*p5,0+p4,0).

A5. The method of embodiment A1 or A2, wherein calculating pq1_0 comprises calculating 2*(dp+dq), wherein dp is equal to (Abs(p0,0−2*p1,0+p2,0)+magGradp6_0+1)>>1.

A6. The method of embodiment A5, wherein magGradp6_0 equals Abs(p7,0−p6,0−p5,0+p4,0), or magGradp6_0 equals Abs(p6,0−2*p5,0+p4,0).

A7. The method of any one of embodiments A1-A6, wherein the step of calculating pq1_0 using maxGradp6_0 is performed as a result of determining that a max filter length for the P block, maxFilterLengthP, is equal to 7.

B1. A method (400) for filtering sample values associated with an image, the method comprising: obtaining (s402) a first set of sample values comprising a first block of sample values (hereafter referred to as the P block) and a second block of sample values (hereafter referred to as the Q block), wherein the P block comprises a set of sample values pi,k for i=0-7 and k=0-3, and the Q block comprises a set of sample values qi,k for i=0-7 and k=0-3; and selecting (s404) a filter, wherein selecting the filter comprises: calculating (s504) a first pq value, pq1, using at least a first value equal to Abs(p2,0−2*p1,0+p0,0) and a second value equal to Abs(q2,0−2*q1,0+q0,0); and comparing (s508) pq1 to a threshold, wherein the threshold is equal to β>>4, and β is selected from a set of predetermined beta values based on a quantization parameter value, Q.

C1. A method for filtering sample values associated with an image, the method comprising: 1) obtaining (s402) a first set of sample values comprising a first block of sample values and a second block of sample values, wherein the first block of sample values comprises a set of sample values B1_i,k for i=0-7 and k=0-3, and the second block of sample values comprises a set of sample values B2_i,k for i=0-7 and k=0-3; and 2) selecting (s404) a filter, wherein selecting the filter comprises: i) calculating a first pq value, pq1_0, wherein calculating pq1_0 comprises calculating a value sp, calculating a value sq, and calculating sp+sq, wherein pq1_0=(sp+sq); ii) comparing pq1_0 to a first threshold; iii) calculating (s505) a second pq value, pq2_0, using at least a first value equal to Abs(B1_2,0−2*B1_1,0+B1_0,0) and a second value equal to Abs(B2_2,0−2*B2_1,0+B2_0,0); and iv) comparing (s508) pq2_0 to a second threshold, wherein the second threshold is equal to β>>4, and β is selected from a set of predetermined beta values based on a quantization parameter value, Q.

C2. The method as in claim C1 wherein selecting the filter further comprises: calculating a third pq value, pq3_0, wherein pq3_0=Abs(B1_0,0−B2_0,0); and comparing pq3_0 with a third threshold, wherein the third threshold is equal to (5*tC+1)>>1, wherein tC is selected from a set of predetermined values based on a quantization parameter value, Q.

C3. The method as in claim C1 or claim C2, wherein selecting the filter further comprises: calculating a fourth pq value, pq2_3; comparing pq2_3 to the second threshold; calculating a fifth pq value, pq1_3; and comparing pq1_3 to the first threshold, wherein the step of calculating pq2_3 comprises calculating pq2_3 using at least a first value equal to Abs(B1_2,3−2*B1_1,3+B1_0,3) and a second value equal to Abs(B2_2,3−2*B2_1,3+B2_0,3), and when maxFilterLengthP is greater than 3 also using a third value Abs(B1_5,3−2*B1_4,3+B1_3,3) and when maxFilterLengthQ is greater than 3 also using a fourth value Abs(B2_5,3−2*B2_4,3+B2−3,3), the step of calculating pq1_3 comprises: calculating a value sp3, calculating a value sq3, and calculating sp3+sq3, where pq1_3=(sp3+sq3).

C4. The method as in claim C3, wherein selecting the filter further comprises: calculating a sixth pq value, pq3_3, wherein pq3_3=Abs(B1_0,3−B2_0,3); and comparing pq3_3 with the third threshold.

C5. The method of any one of claims C1-C4, wherein the filter is used to modify 7 samples on each of lines 0 to line 3 in block B1 when conditions for line 0 and line 3 are less than a respective threshold (e.g. for line 0 pq1_0<thr1 and pq2_0<thr2 and pq3_0<thr3 and line 3 pq1_3<thr1 and pq2_3<thr2 and pq3_3<thr3).

C6. The method as in claim C5, wherein thr1 is equal to $3*\beta>>5$, thr2 is equal to $\beta>>4$ and thr3 is equal to $(5*tC+1)>>1$.

C7. The method of any one of claims C1-C6, wherein the first block has a maximum filter length, maxFilterLengthP, if maxFilterLengthP is equal to 7, then calculating sp comprises calculating sp=(Abs(B1_0,0−B1_3,0)+Abs(B1_3,0−B1_7,0)+maxGradB1_6, 0+1)>>1, where maxGradB1_6,0 is a gradient value, if maxFilterLengthP is 5, then calculating sp comprises calculating sp=(Abs(B1_0,0−B1_3,0)+Abs(B1_3,0−B1_5,0)+1)>>1, and if maxFilterLengthP is equal to 3, then calculating sp comprises calculating sp=Abs(B1_0,0−B1_3,0).

C8. The method of claim C7, wherein maxGradB1_6,0 equals Abs(B1_7,0−B1_6,0−B1_5,0+B1_4,0).

C9. The method of any one of claims C1-C9, wherein the second block has a maximum filter length, maxFilterLengthQ, if maxFilterLengthQ is equal to 7, then calculating sq comprises calculating sq=(Abs(B2_0,0−B2_3,0)+Abs(B2_3,0−B2_7,0)+maxGradB2_6, 0+1)>>1, where maxGradB2_6,0 is a gradient value, if maxFilterLengthQ is equal to 5, then calculating sq comprises calculating sq=(Abs(B2_0,0−B2_3,0)+Abs(B2_3,0−B2_5,0)+1)>>1, and if maxFilterLengthQ is equal to 3, then calculating sq comprises calculating sq=Abs(B1_0,0−B1_3,0).

C10. The method of claim C9, wherein maxGradB2_6,0 equals Abs(B2_7,0−B2_6,0−B2_5,0+B2_4,0).

C11. The method of any one of claims C1-C10, wherein and when maxFilterLengthP is greater than 3 also using a third value Abs(B1_5,0−2*B1_4,0+B1_3,0) and wherein the second block has a maximum filter length, maxFilterLengthQ, and when maxFilterLengthQ is greater than 3 also using a fourth value Abs(B2_5,0−2*B2_4,0+B2_3,0).

C12. The method of claim C3 or C4, wherein if maxFilterLengthP is equal to 7, then calculating sp3 comprises calculating sp3=(Abs(B1_0,3−B1_3,3)+Abs(B1_3,3−B1_7,3)+maxGradB1_6,3+1)>>1, where maxGradB1_6,3 is a gradient value, if maxFilterLengthP is equal to 5, then calculating sp3 comprises calculating sp3=(Abs(B1_0,3−B1_3,3)+Abs(B1_3,3−B1_5,3)+1)>>1, if maxFilterLengthP is equal to 5, then calculating sp3 comprises calculating sp3=Abs(B1_0,3−B1_3,3), if maxFilterLengthQ is equal to 7, then calculating sq3 comprises calculating sq3=(Abs(B2_0,3−B2_3,3)+Abs(B2_3,3−B2_7,3)+maxGradB2_6,3+1)>>1, where maxGradB2_6,3 is a gradient value, if maxFilterLengthQ is equal to 5, then calculating sq3 comprises calculating sq3=(Abs(B2_0,3−B2_3,3)+Abs(B2_3,3−B2_5,3)+1)>>1, and if maxFilterLengthQ is equal to 3, then calculating sq3 comprises calculating sq3=Abs(B2_0,3−B2_3,3).

D1. A method (400) for filtering sample values associated with an image, the method comprising: obtaining (s402) a first set of sample values comprising a first block of sample values and a second block of sample values, wherein the first block of sample values comprises a set of sample values B1_i,k for i=0-7 and k=0-3, and the second block of sample values comprises a set of sample values B2_i,k for i=0-7 and k=0-3; and deciding (s404) whether or not to use a long filter to filter at least a subset of the first set of sample values, wherein deciding whether or not to use a long filter to filter at least a subset of the first set of sample values comprises: calculating (s502) a first gradient value, maxGradB1_6,0, using sample value B1_6,0; calculating (s504) a first pq value, pq1_0, using maxGradB1_6,0; and comparing (s508) pq1_0 to a threshold.

D2. The method of claim D1, wherein deciding whether or not to use a long filter to filter at least a subset of the first set of sample values further comprises: calculating a second gradient value, maxGradB1_6,3, using sample value B1_6,3, calculating a second pq value, pq1_3, using maxGradB1_6,3, and comparing (s508) pq1_3 to the threshold.

D3. The method of claim D1 or D2, wherein calculating pq1_0 comprises calculating a value sp, calculating a value sq, and calculating sp+sq, wherein pq1_0=(sp+sq), and wherein calculating sp comprises calculating sp=(Abs(B1_0,0−B1_3,0)+Abs(B1_3,0−B1_7,0)+maxGradB1_6,0+1)>>1.

D4. The method of claim D3, wherein maxGradB1_6,0 equals Abs(B1_7,0−B1_6,0−B1_5,0+B1_4,0).

D5. The method of claim D3 or D4, wherein the second block has a maximum filter length, maxFilterLengthQ, if maxFilterLengthQ is equal to 7, then sq=(Abs(B2_0,0−B2_3,0)+Abs(B2_3,0−B2_7,0)+maxGradB2_6, 0+1)>>1, where maxGradB2_6,0 is a third gradient value, if maxFilterLengthQ is equal to 5, then sq=(Abs(B2_0,0−B2_3,0)+Abs(B2_3,0−B2_5,0)+1)>>1, and if maxFilterLengthQ is not equal to 7 and is not equal to 5, then sq=Abs(B2_0,0−B2_3,0).

D6. The method of claim D5, wherein maxGradB2_6,0 equals Abs(B2_7,0−B2_6,0−B2_5,0+B2_4,0).

D7. The method of any one of claims D2-D6, wherein calculating pq1_3 comprises calculating a value sp3, calculating a value sq3, and calculating sp3+sq3, wherein pq1_3=(sp3+sq3), and wherein calculating sp3 comprises calculating sp3=(Abs(B1_0,3−B1_3,3)+Abs(B1_3,3−B1_7,3)+maxGradB1_6,3+1)>>1.

D8. The method of claim D7, wherein maxGradB1_6,3 equals Abs(B1_7,3−B1_6,3−B1_5,3+B1_4,3).

D9. The method of any one of claims D1-D8, wherein the step of calculating pq1_0 using maxGradB1_6,0 is performed as a result of determining that a maximum filter length for the first block, maxFilterLengthP, is equal to 7.

D10. The method of any one of claims D2-D9, wherein the step of calculating pq1_3 using maxGradB1_6,3 is performed as a result of determining that a max filter length for the first block, maxFilterLengthP, is equal to 7.

D11. The method of claim D7, wherein the second block has a maximum filter length, maxFilterLengthQ, if maxFilterLengthQ is equal to 7, then sq3=(Abs(B2_0,3−B2_3,3)+Abs(B2_3,3−B2_7,3)+maxGradB2_6,3+1)>>1, where maxGradB2_6,3 is a fourth gradient value, if maxFilterLengthQ is equal to 5, then sq3=(Abs(B2_0,3−B2_3,3)+Abs(B2_3,3−B2_5,3)+1)>>1, and if maxFilterLengthQ is not equal to 5 and not equal to 7, then sq3=Abs(B2_0,3−B2_3,3).

D12. The method of claim D11, wherein maxGradB2_6,3 equals Abs(B2_7,3−B2_6,3−B2_5,3+B2_4,3).

D13. The method of any one of claims D1-D12, wherein when deblocking a vertical boundary, the i value identifies a column of a block and the k value identifies a row of the block, and when deblocking a horizontal boundary, the k value identifies a column of the block and the i value identifies a row of the block.

D14. The method of any one of claims D1-D13, wherein B1_0,0 refers to the sample in the first block which is closest to a sample B2_0,0 in the second block, wherein B1_1,0 is closest to B1_0,0, B1_2,0 is closest to B1_1,0, B1_3,0 is closest to B1_2,0, B1_4,0 is closest to B1_3,0, B1_5,0 is closest to B1_4,0, B1_6,0 is closest to B1_5,0, B1_7,0 is closest to B1_6,0, B2_1,0 is closest to B2_0,0, B2_2,0 is closest to B2_1,0, B2_3,0 is closest to B2_2,0, B2_4,0 is closest to B2_3,0, B2_5,0 is closest to B2_4,0, B2_6,0 is closest to B2_5,0, B2_7,0 is closest to B2_6,0, wherein B1_0,3 refers to the sample in the first block which is closest to a sample B2_0,3 in the second block, wherein B1_1,3 is closest to B1_0,3, B1_2,3 is closest to B1_1,3, B1_3,3 is closest to B1_2,3, B1_4,3 is closest to B1_3,3, B1_5,3 is closest to B1_4,3, B1_6,3 is closest to B1_5,3, B1_7,3 is closest to B1_6,3, B2_1,3 is closest to B2_0,3, B2_2,3 is closest to B2_1,3, B2_3,3 is closest to B2_2,3, B2_4,3 is closest to B2_3,3, B2_5,3 is closest to B2_4,3, B2_6,3 is closest to B2_5,3, B2_7,3 is closest to B2_6,3.

D15. The method of any one of claims D1-D14, wherein the samples to filter by the long filter when maxFilterLengthP is equal to 7 are B1_0,0 to B1_6,0, B1_0,1 to B1_6,1, B1_0,2 to B1_6,2 and B1_0,3 to B1_6,3.

D16. The method of any one of claims D1-D15, wherein the samples to filter by the long filter when maxFilterLengthQ is equal to 7 are B2_0,0 to B2_6,0, B2_0,1 to B2_6,1, B2_0,2 to B2_6,2 and B2_0,3 to B2_6,3.

E1. A method (400) for filtering sample values associated with an image, the method comprising: obtaining (s402) a first set of sample values comprising a first block of sample values and a second block of sample values, wherein the first block of sample values comprises a set of sample values B1_i,k for i=0-7 and k=0-3, and the second block of sample values comprises a set of sample values B2_i,k for i=0-7 and k=0-3; and selecting (s404) a filter, wherein selecting the filter comprises: calculating (s505) a first pq value, pq2_0, using at least a first value equal to Abs(B1_2,0−2*B1_1,0+B1_0,0) and a second value equal to Abs(B2_2,0−2*B2_1,0+B2_0,0); and comparing (s508) pq2_0 to a threshold, wherein the threshold is equal to $\beta>>4$, and $\beta$ is selected from a set of predetermined beta values based on a quantization parameter value, Q.

E2. The method of E1 wherein selecting the filter further comprises calculating a second pq value, pq2_3, using at least a first value equal to Abs(B1_2,3−2*B1_1,3+B1_0,3) and a second value equal to Abs(B2_2,3−2*B2_1,3+B2_0,3); and comparing pq2_3 to the threshold.

F1. An encoder (140) or a decoder (260) adapted to perform the method of any one of the above embodiments.

F2. An apparatus (500), wherein the apparatus implements the encoder (140) or the decoder (260) of embodiment F1.

G1. A computer program (643) comprising instructions (644) which when executed by processing circuitry (602) causes the processing circuitry (602) to perform the method of any one of the above embodiments.

G2. A carrier containing the computer program of embodiment G1, wherein the carrier is one of an electronic signal, an optical signal, a radio signal, and a computer readable storage medium (642).

H1. An apparatus (600) for filtering sample values associated with an image, the apparatus comprising: an obtaining module (702 (see FIG. 7)) adapted to obtain a first set of sample values comprising a first block of sample values (hereafter referred to as the P block) and a second block of sample values (hereafter referred to as the Q block), wherein the P block comprises a set of sample values pi,k for i=0-7 and k=0-3, and the Q block comprises a set of sample values qi,k for i=0-7 and k=0-3; and a filter selection module (704 (see FIG. 7)) adapted to decide whether or not to use a long filter to filter at least a subset of the first set of sample values, wherein the filter selection module (704) is configured to decide whether or not to use a long filter to filter at least a subset of the first set of sample values by performing a process that includes: calculating (s502) a first gradient value, maxGradp6_0, using sample value p6,0; calculating (s504) a first pq value, pq1_0, using maxGradp6_0; and comparing (s508) pq1_0 to a threshold.

I1. An apparatus (600) for filtering sample values associated with an image, the apparatus comprising: an obtaining module (702 (see FIG. 7)) adapted to obtain a first set of sample values comprising a first block of sample values (hereafter referred to as the P block) and a second block of sample values (hereafter referred to as the Q block), wherein the P block comprises a set of sample values pi,k for i=0-7 and k=0-3, and the Q block comprises a set of sample values qi,k for i=0-7 and k=0-3; and a filter selection module (704 (see FIG. 7)) adapted to select a filter, wherein the filter selection module (704) is configured to select a by performing a process that includes: calculating (s504) a first pq value, pq1, using at least a first value equal to Abs(p2,0−2*p1,0+p0,0) and a second value equal to Abs(q2,0−2*q1,0+q0,0); and comparing (s508) pq1 to a threshold, wherein the threshold is equal to $\beta>>4$, and $\beta$ is selected from a set of predetermined beta values based on a quantization parameter value, Q.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for deblocking filtering of vertical and/or horizontal block boundaries, the method being performed by an image or video encoder or an image or video decoder, the method comprising:

obtaining a first set of sample values comprising a first block of sample values and a second block of sample values, wherein the first block of sample values comprises a set of sample values B1_i,k for i=0-7 and k=0-3, the second block of sample values comprises a set of sample values B2_j,k for j=0-7 and k=0-3 and the second block has a maximum filter length, maxFilterLengthQ;

deciding whether or not to use a long filter to filter at least a subset of the first set of sample values, wherein deciding whether or not to use a long filter to filter at least a subset of the first set of sample values comprises:
  calculating a first gradient value, maxGradB1_6,0 as Abs(B1_7,0−B1_6,0−B1_5,0+B1_4,0);
  calculating a first pq value, pq1_0, using maxGradB1_6,0, wherein pq1_0=(sp+sq), wherein sp=(Abs(B1_0,0−B1_3,0)+Abs(B1_3,0−B1_7,0)+maxGradB1_6,0+1)>>1 and wherein:
    if maxFilterLengthQ is equal to 7, then sq=(Abs(B2_0,0−B2_3,0)+Abs(B2_3,0−B2_7,0)+maxGradB2_6,0+1)>>1, where maxGradB2_6,0 is a third gradient value,
    if maxFilterLengthQ is equal to 5, then sq=(Abs(B2_0,0−B2_3,0)+Abs(B2_3,0−B2_5,0)+1)>>1, and
    if maxFilterLengthQ is not equal to 7 and is not equal to 5, then sq=Abs(B2_0,0−B2_3,0);
  comparing pq1_0 to a threshold, wherein the threshold is based on a value β that is selected from a set of predetermined beta values based on a quantization parameter value, Q;
  calculating a second gradient value, maxGradB1_6,3, using sample value B1_6,3;
  calculating a second pq value, pq1_3, using maxGradB1_6,3; and
  comparing pq1_3 to the threshold; and
applying the long filter to filter at least the subset of the first set of sample values, as a result of deciding to use the long filter.

2. The method of claim 1, wherein maxGradB2_6,0 equals Abs(B2_7,0−B2_6,0−B2_5,0+B2_4,0).

3. The method of claim 1, wherein pq1_3=(sp3+sq3), and wherein sp3=(Abs(B1_0,3−B1_3,3)+Abs(B1_3,3−B1_7,3)+maxGradB1_6,3+1)>>1.

4. The method of claim 3, wherein maxGradB1_6,3 equals Abs(B1_7,3−B1_6,3−B1_5,3+B1_4,3).

5. The method of claim 1, wherein
the step of calculating pq1_0 using maxGradB1_6,0 is performed as a result of determining that a maximum filter length for the first block, maxFilterLengthP, is equal to 7.

6. The method of claim 1, wherein
the step of calculating pq1_3 using maxGradB1_6,3 is performed as a result of determining that a max filter length for the first block, maxFilterLengthP, is equal to 7.

7. The method of claim 1, wherein
when deblocking a vertical boundary, the i value identifies a column of a block and the k value identifies a row of the block, and
when deblocking a horizontal boundary, the k value identifies a column of the block and the i value identifies a row of the block.

8. The method of claim 1, wherein the samples to filter by the long filter when maxFilterLengthP is equal to 7 are B1_0,0 to B1_6,0, B1_0,1 to B1_6,1, B1_0,2 to B1_6,2 and B1_0,3 to B1_6,3.

9. The method of claim 1, wherein the samples to filter by the long filter when maxFilterLengthQ is equal to 7 are B2_0,0 to B2_6,0, B2_0,1 to B2_6,1, B2_0,2 to B2_6,2 and B2_0,3 to B2_6,3.

10. A non-transitory computer readable medium storing a computer program comprising instructions which when executed by processing circuitry causes the processing circuitry to perform the method of claim 1.

11. An apparatus for deblocking filtering of vertical and/or horizontal block boundaries, the apparatus comprising:
  memory; and
  processing circuitry coupled to the memory, wherein the apparatus is configured to perform a method comprising:
    obtaining a first set of sample values comprising a first block of sample values and a second block of sample values, wherein the first block of sample values comprises a set of sample values B1_i,k for i=0-7 and k=0-3, the second block of sample values comprises a set of sample values B2_j,k for j=0-7 and k=0-3 and the second block has a maximum filter length, maxFilterLengthQ;
    deciding whether or not to use a long filter to filter at least a subset of the first set of sample values, wherein deciding whether or not to use a long filter to filter at least a subset of the first set of sample values comprises:
      calculating a first gradient value, maxGradB1_6,0 as Abs(B1_7,0−B1_6,0−B1_5,0+B1_4,0);
      calculating a first pq value, pq1_0, using maxGradB1_6,0, wherein pq1_0=(sp+sq), wherein sp=(Abs(B1_0,0−B1_3,0)+Abs(B1_3,0−B1_7,0)+maxGradB1_6,0+1)>>1 and wherein:
        if maxFilterLengthQ is equal to 7, then sq=(Abs(B2_0,0−B2_3,0)+Abs(B2_3,0−B2_7,0)+maxGradB2_6,0+1)>>1, where maxGradB2_6,0 is a third gradient value,
        if maxFilterLengthQ is equal to 5, then sq=(Abs(B2_0,0−B2_3,0)+Abs(B2_3,0−B2_5,0)+1)>>1, and
        if maxFilterLengthQ is not equal to 7 and is not equal to 5, then sq=Abs(B2_0,0−B2_3,0);
      comparing pq1_0 to a threshold, wherein the threshold is based on a value β that is selected from a set of predetermined beta values based on a quantization parameter value, Q;
      calculating a second gradient value, maxGradB1_6,3, using sample value B1_6,3;
      calculating a second pq value, pq1_3, using maxGradB1_6,3; and
      comparing pq1_3 to the threshold; and
    applying the long filter to filter at least the subset of the first set of sample values, as a result of deciding to use the long filter.

12. The apparatus of claim 11, wherein maxGradB2_6,0 equals Abs(B2_7,0−B2_6,0−B2_5,0+B2_4,0).

13. The apparatus of claim 11, wherein pq1_3=(sp3+sq3), and wherein sp3=(Abs(B1_0,3−B1_3,3)+Abs(B1_3,3−B1_7,3)+maxGradB1_6,3+1)>>1.

14. The apparatus of claim 13, wherein maxGradB1_6,3 equals Abs(B1_7,3−B1_6,3−B1_5,3+B1_4,3).

15. The apparatus of claim 11, wherein
the step of calculating pq1_0 using maxGradB1_6,0 is performed as a result of determining that a maximum filter length for the first block, maxFilterLengthP, is equal to 7.

16. The apparatus of claim 11, wherein
the step of calculating pq1_3 using maxGradB1_6,3 is performed as a result of determining that a max filter length for the first block, maxFilterLengthP, is equal to 7.

17. The apparatus of claim 11, wherein
when deblocking a vertical boundary, the i value identifies a column of a block and the k value identifies a row of the block, and
when deblocking a horizontal boundary, the k value identifies a column of the block and the i value identifies a row of the block.

18. The apparatus of claim 11, wherein the samples to filter by the long filter when maxFilterLengthP is equal to 7 are B1_0,0 to B1_6,0, B1_0,1 to B1_6,1, B1_0,2 to B1_6,2 and B1_0,3 to B1_6,3.

19. The apparatus of claim 11, wherein the samples to filter by the long filter when maxFilterLengthQ is equal to 7 are B2_0,0 to B2_6,0, B2_0,1 to B2_6,1, B2_0,2 to B2_6,2 and B2_0,3 to B2_6,3.

* * * * *